United States Patent
Takeda et al.

(10) Patent No.: US 11,910,219 B2
(45) Date of Patent: Feb. 20, 2024

(54) LTE CELL-SPECIFIC REFERENCE SIGNAL INTERFERENCE HANDLING

(71) Applicant: QUALCOMM Incorporated, San Diego, CA (US)

(72) Inventors: Kazuki Takeda, Tokyo (JP); Alberto Rico Alvarino, San Diego, CA (US); Yosuke Sano, Yokohama (JP)

(73) Assignee: QUALCOMM Incorporated, San Diego, CA (US)

( * ) Notice: Subject to any disclaimer, the term of this patent is extended or adjusted under 35 U.S.C. 154(b) by 75 days.

(21) Appl. No.: 17/644,506

(22) Filed: Dec. 15, 2021

(65) Prior Publication Data

US 2023/0189034 A1    Jun. 15, 2023

(51) Int. Cl.
| | |
|---|---|
| *H04W 24/10* | (2009.01) |
| *H04B 17/336* | (2015.01) |
| *H04B 7/06* | (2006.01) |
| *H04L 1/00* | (2006.01) |
| *H04L 5/00* | (2006.01) |

(52) U.S. Cl.
CPC .......... *H04W 24/10* (2013.01); *H04B 7/0626* (2013.01); *H04B 17/336* (2015.01); *H04L 1/0069* (2013.01); *H04L 5/0051* (2013.01)

(58) Field of Classification Search
CPC ... H04W 24/10; H04B 7/0626; H04B 17/336; H04L 1/0069; H04L 5/0051
See application file for complete search history.

(56) References Cited

U.S. PATENT DOCUMENTS

| | | | |
|---|---|---|---|
| 2015/0146644 A1 | 5/2015 | Kim et al. | |
| 2015/0312082 A1* | 10/2015 | Shin | H04L 1/0003 370/329 |
| 2016/0269940 A1* | 9/2016 | Takeda | H04W 24/02 |
| 2017/0034731 A1* | 2/2017 | Lee | H04W 24/10 |
| 2017/0188371 A1 | 6/2017 | Kim et al. | |
| 2022/0360998 A1* | 11/2022 | Park | H04L 5/005 |

FOREIGN PATENT DOCUMENTS

| | | | |
|---|---|---|---|
| EP | 2760145 A1 | 7/2014 | |
| EP | 4236218 A1 * | 8/2023 | ............. H04L 25/08 |
| WO | WO-2022025557 A1 * | 2/2022 | |

OTHER PUBLICATIONS

International Search Report and Written Opinion—PCT/US2022/079882—ISA/EPO—dated Mar. 14, 2023.

* cited by examiner

*Primary Examiner* — Deepa Belur
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a configuration of a set of resource elements for Long Term Evolution (LTE) cell-specific reference signal (LTE-CRS) interference measurements associated with one or more neighboring LTE cells. The UE may perform the LTE-CRS interference measurements on the set of resource elements. The UE may transmit, to the base station, an interference measurement indication based at least in part on the LTE-CRS interference measurements. Numerous other aspects are described.

24 Claims, 10 Drawing Sheets

LTE CELL-SPECIFIC REFERENCE SIGNAL INTERFERENCE HANDLING

FIELD OF THE DISCLOSURE

Aspects of the present disclosure generally relate to wireless communication and to techniques and apparatuses for Long Term Evolution (LTE) cell-specific reference signal (LTE-CRS) interference handling.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The user equipment may include a memory and one or more processors coupled to the memory. The one or more processors may be configured to receive, from a base station, a configuration of a set of resource elements for long term evolution (LTE) cell-specific reference signal (LTE-CRS) interference measurements associated with one or more neighboring LTE cells. The one or more processors may be configured to perform the LTE-CRS interference measurements on the set of resource elements. The one or more processors may be configured to transmit, to the base station, an interference measurement indication based at least in part on the LTE-CRS interference measurements.

Some aspects described herein relate to a base station for wireless communication. The base station may include a memory and one or more processors coupled to the memory. The one or more processors may be configured to transmit, to a UE, a configuration of a set of resource elements for LTE-CRS interference measurements associated with one or more neighboring LTE cells. The one or more processors may be configured to receive, from the UE, an interference measurement indication associated with the LTE-CRS interference measurements in the set of resource elements.

Some aspects described herein relate to a method of wireless communication performed by a UE. The method may include receiving, from a base station, a configuration of a set of resource elements for LTE-CRS interference measurements associated with one or more neighboring LTE cells. The method may include performing the LTE-CRS interference measurements on the set of resource elements. The method may include transmitting, to the base station, an interference measurement indication based at least in part on the LTE-CRS interference measurements.

Some aspects described herein relate to a method of wireless communication performed by a base station. The method may include transmitting, to a UE, a configuration of a set of resource elements for LTE-CRS interference measurements associated with one or more neighboring LTE cells. The method may include receiving, from the UE, an interference measurement indication associated with the LTE-CRS interference measurements in the set of resource elements.

Some aspects described herein relate to a non-transitory computer-readable medium that stores a set of instructions for wireless communication by a UE. The set of instructions, when executed by one or more processors of the UE, may cause the UE to receive, from a base station, a configuration of a set of resource elements for LTE-CRS interference measurements associated with one or more neighboring LTE cells. The set of instructions, when executed by one or more processors of the UE, may cause the UE to perform the LTE-CRS interference measurements on the set of resource elements. The set of instructions, when executed by one or more processors of the UE, may cause the UE to transmit, to the base station, an interference measurement indication based at least in part on the LTE-CRS interference measurements.

Some aspects described herein relate to a non-transitory computer-readable medium that stores a set of instructions for wireless communication by a base station. The set of instructions, when executed by one or more processors of the base station, may cause the base station to transmit, to a UE, a configuration of a set of resource elements for LTE-CRS interference measurements associated with one or more neighboring LTE cells. The set of instructions, when executed by one or more processors of the base station, may cause the base station to receive, from the UE, an interference measurement indication associated with the LTE-CRS interference measurements in the set of resource elements.

Some aspects described herein relate to an apparatus for wireless communication. The apparatus may include means for receiving, from a base station, a configuration of a set of resource elements for LTE-CRS interference measurements associated with one or more neighboring LTE cells. The apparatus may include means for performing the LTE-CRS interference measurements on the set of resource elements. The apparatus may include means for transmitting, to the base station, an interference measurement indication based at least in part on the LTE-CRS interference measurements.

Some aspects described herein relate to an apparatus for wireless communication. The apparatus may include means for transmitting, to a UE, a configuration of a set of resource elements for LTE-CRS interference measurements associated with one or more neighboring LTE cells. The apparatus may include means for receiving, from the UE, an interference measurement indication associated with the LTE-CRS interference measurements in the set of resource elements.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
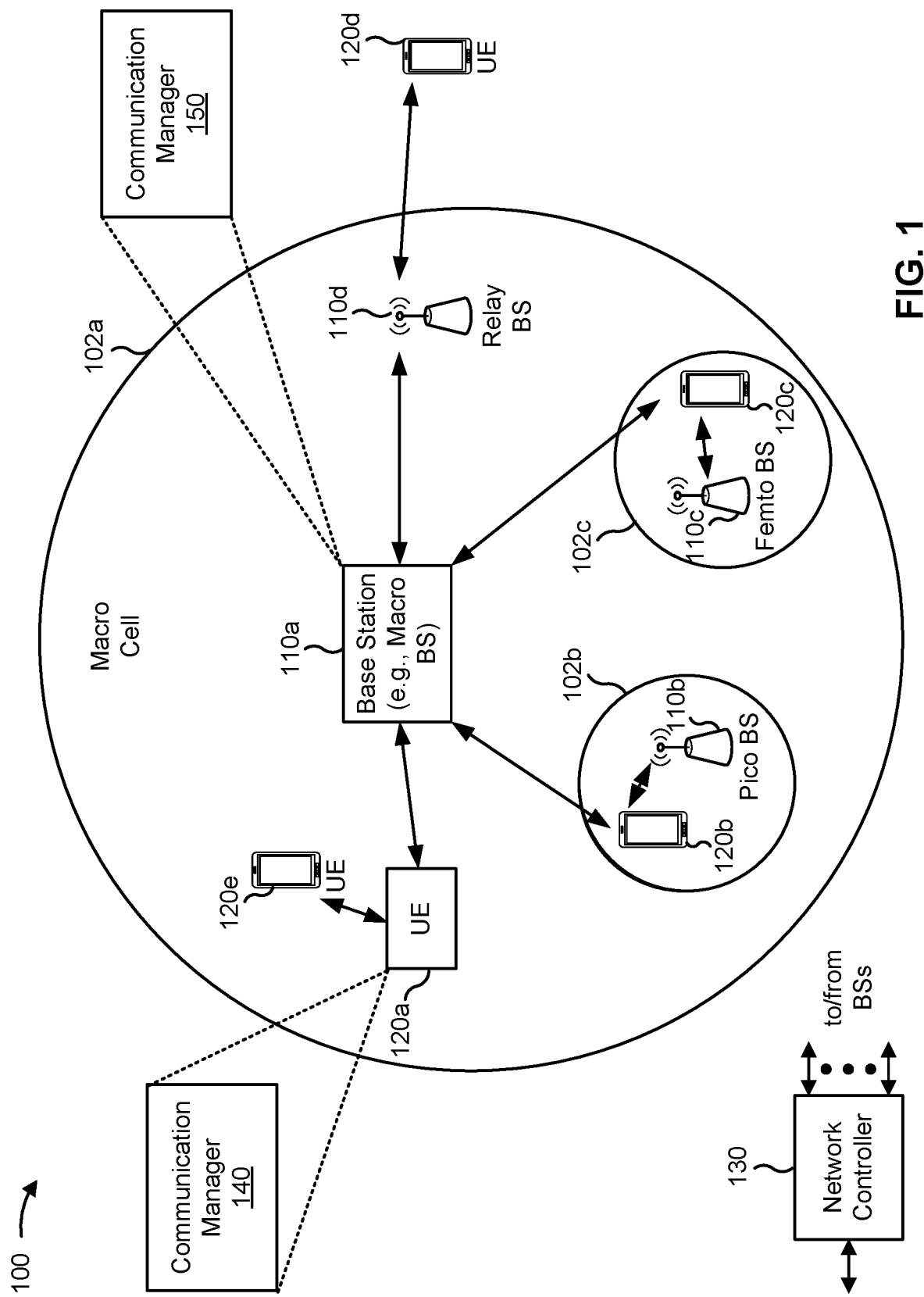
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peerto-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station, a configuration of a set of resource elements (REs) for LTE cell-specific reference signal (LTE-CRS) interference measurements associated with one or more neighboring LTE cells; perform the LTE-CRS interference measurements on the set of REs; and transmit, to the base station, an interference measurement indication based at least in part on the LTE-CRS interference measurements. Additionally, or alternatively, the communication manager 140 may perform one or more other operations described herein.

In some aspects, the base station 110 may include a communication manager 150. As described in more detail elsewhere herein, the communication manager 150 may transmit, to a UE, a configuration of a set of REs for LTE-CRS interference measurements associated with one or more neighboring LTE cells; and receive, from the UE, an interference measurement indication associated with the LTE-CRS interference measurements in the set of REs. Additionally, or alternatively, the communication manager 150 may perform one or more other operations described herein.

As indicated above, FIG. 1 is provided as an example. Other examples may differ from what is described with regard to FIG. 1.

Figure 2:
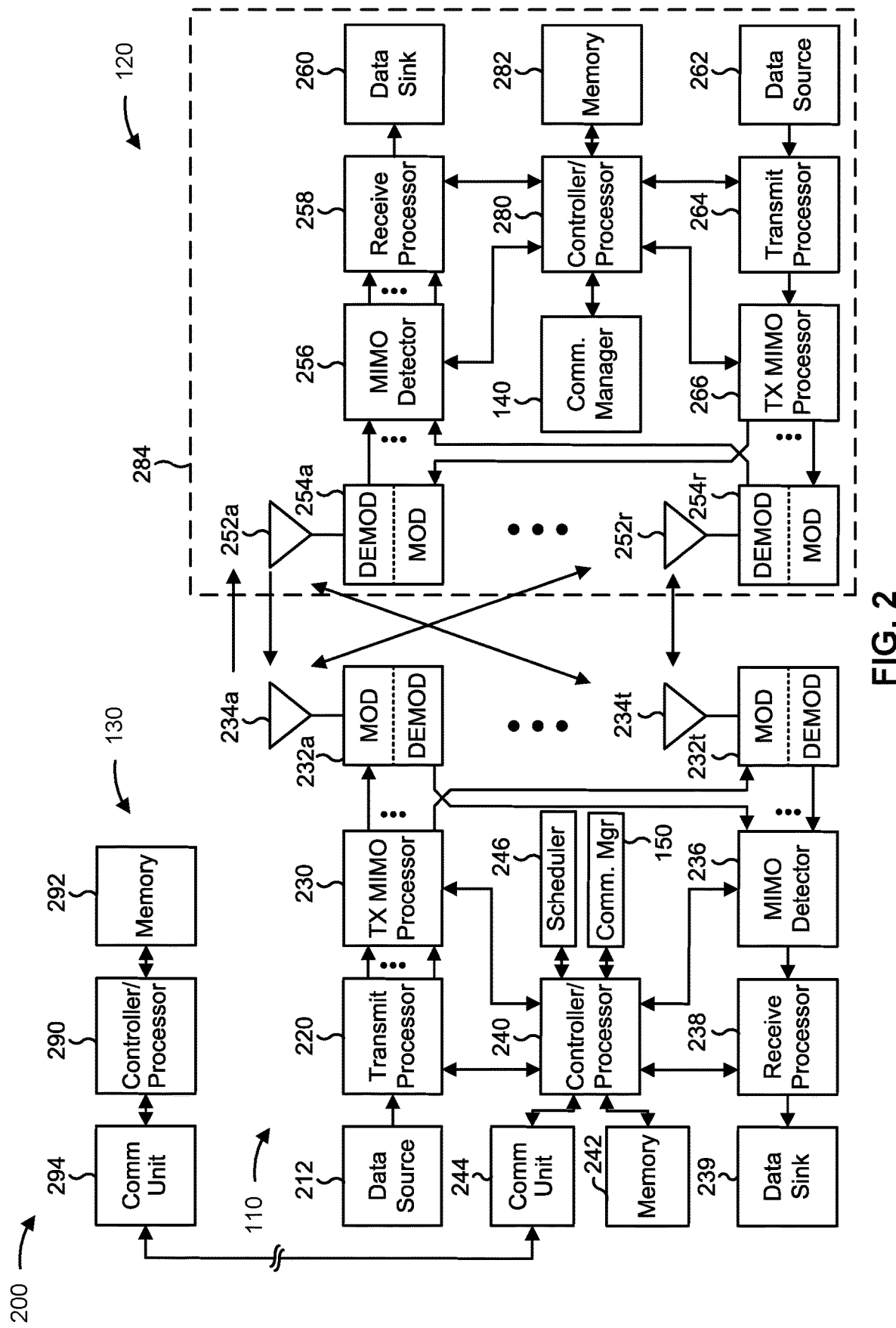
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 4-10).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 4-10).

The controller/processor 240 of the base station 110, the controller/processor 280 of the UE 120, and/or any other component(s) of FIG. 2 may perform one or more techniques associated with LTE-CRS interference handling, as described in more detail elsewhere herein. For example, the controller/processor 240 of the base station 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving, from a base station, a configuration of a set of REs for LTE-CRS interference measurements associated with one or more neighboring LTE cells; means for performing the LTE-CRS interference measurements on the set of REs; and/or means for transmitting, to the base station, an interference measurement indication based at least in part on the LTE-CRS interference measurements. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station 110 includes means for transmitting, to a UE, a configuration of a set of REs for LTE-CRS interference measurements associated with one or more neighboring LTE cells; and/or means for receiving, from the UE, an interference measurement indication associated with the LTE-CRS interference measurements in the set of REs. The means for the base station 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
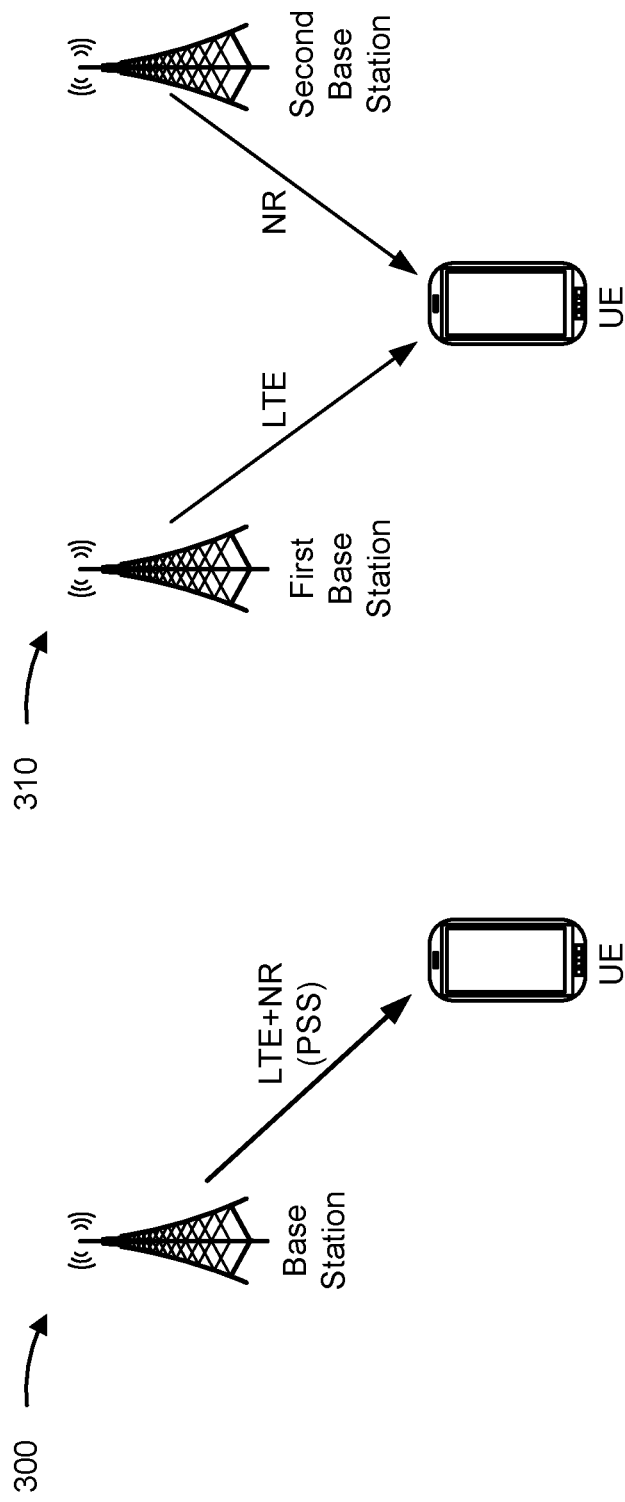
FIG. 3 is a diagram illustrating examples of Long Term Evolution (LTE) cell-specific reference signal (LTE-CRS) interference in a New Radio (NR) cell, in accordance with the present disclosure.

FIG. 3 is a diagram illustrating an examples 300 and 310 of LTE-CRS interference in an NR cell, in accordance with the present disclosure. As shown in FIG. 3, examples 300 and 310 show scenarios in which a UE (e.g., UE 120) is in a location at which both which LTE (e.g., 4G) and NR (e.g., 5G) coverage are available. In such scenarios, an NR UE (e.g., a UE communicating with a base station via NR coverage) may experience interference from LTE-CRSs. An LTE-CRS is a reference signal transmitted in an LTE cell.

Example 300 shows a network in which a UE (e.g., UE 120) is located in a cell associated with a base station (e.g., base station 110), and the base station operates using dynamic spectrum sharing (DSS). DSS is an antenna technology that enables parallel use of LTE and NR in the same frequency band. As shown in example 300, DSS operation enables the base station to communicate with the UE (e.g., and/or other UEs in the cell associated with the base station) using LTE or NR. In a case in which the UE is an NR UE, the UE may experience interference, when receiving NR downlink communications (e.g., physical downlink shared channel (PDSCH) and/or physical downlink control channel (PDCCH) communications) from the base station, due to LTE-CRS transmissions from the base station. For a cell associated with a base station operating using DSS, all NR UEs in the cell may suffer from the same LTE-CRS interference from the same base station on the same carrier.

Example 310 shows a network in which an LTE cell and an NR cell are operated by neighboring base stations (e.g., base station 110). As shown in example 310, a first base station operates the LTE cell, and a second base station operates the NR cell. A UE (e.g., 120) may be located in the LTE cell and the NR cell. In a case in which the UE is an NR UE, the UE may experience interference, when receiving NR downlink communications (e.g., PDSCH and/or PDCCH communications) from the second base station, due to LTE-CRS transmissions from the first base station. In a case in which LTE and NR cells are operated by neighboring base stations, different UEs in the NR cell may suffer different amounts of LTE-CRS interference (or no LTE-CRS interference) from the LTE base station (e.g., the first base station).

In some examples, an NR base station may configure NR UEs with a semi-static cell-common rate-matching pattern for PDSCH rate-matching around LTE-CRS transmissions. In this case, an NR UE may rate-match around resources associated with LTE-CRS transmissions when receiving PDSCH communications from the NR base station, using the configured rate-matching pattern. This may be effective for reducing LTE-CRS interference in DSS cells because all of the NR UEs experience the same LTE-CRS interference in such DSS cells. However, the semi-static cell-common rate-matching configuration may not be as effective in a case in which UEs in an NR cell experience LTE-CRS interference from one or more neighboring LTE cells. In this case, because different UEs in the NR cell experience different amounts of LTE-CRS interference (or no LTE-CRS interference) from one or more neighboring LTE cells, a semi-static cell common rate-matching pattern configuration may result in some UEs performing unnecessary rate matching (e.g., resulting in an unnecessary increase in overhead and latency for PDSCH and/or PDCCH communications) and/or some UEs not rate-matching around LTE-CRS transmissions that cause significant interference (e.g., resulting in reduced reliability for PDSCH and/or PDCCH communications).

Some techniques and apparatuses described herein enable a UE to receive, from a base station (e.g., an NR base station), a configuration of a set of REs for LTE-CRS measurements associated with one or more neighboring LTE cells. The UE may perform LTE-interference measurements on the set of REs, and the UE may transmit, to the base station, an interference measurement indication based at least in part on the LTE-CRS measurements. The base station may transmit, to the UE, a rate-matching indication that identifies an LTE-CRS rate-matching pattern to be used by the UE (e.g., for receiving PDSCH and/or PDCCH communications). In some aspects, the interference measurement indication may include respective interference measurements for one or more LTE-CRSs. In some aspects, the interference measurement indication may include a recommended LTE-CRS rate-matching pattern identified by the UE. As a result, the UE may perform rate-matching using a UE-specific LTE-CRS rate matching pattern that is based at least in part on the LTE-CRS interference measured by the UE. Thus, the UE may perform rate-matching around LTE-CRS transmissions that cause interference with downlink communications to the UE (e.g., resulting in reduced interference and increased reliability of downlink communications), without performing unnecessary rate-matching around LTE-CRS transmissions that do not cause significant interference with downlink communications to the UE (e.g., resulting in reduced overhead and latency of downlink communications, as compared with a cell-common configuration that applies to all UEs in the NR cell).

As indicated above, FIG. 3 is provided as an example. Other examples may differ from what is described with respect to FIG. 3.

Figure 4:
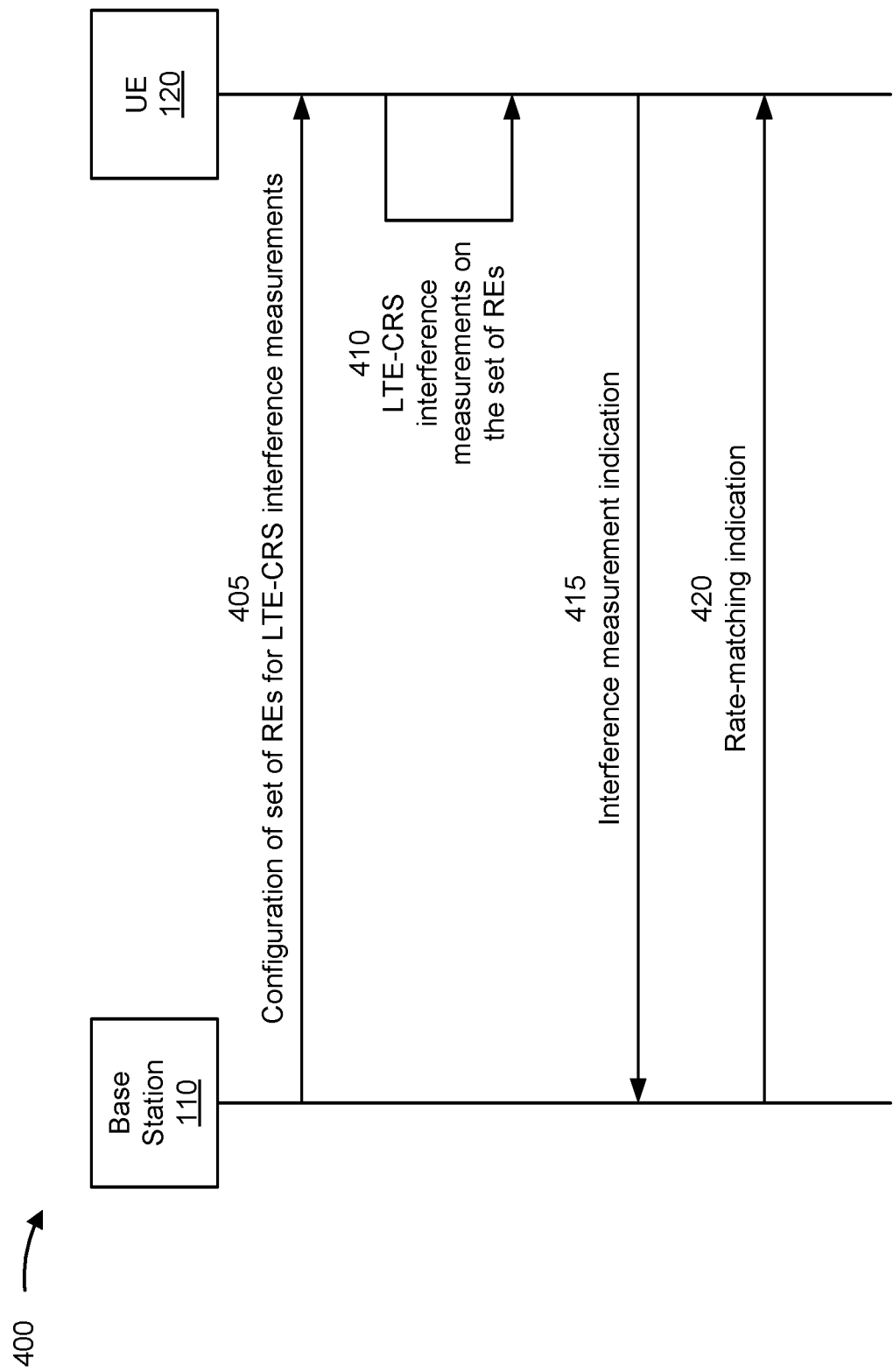
FIGS. 4-6 are diagrams illustrating examples associated with LTE-CRS interference handling, in accordance with the present disclosure.

FIG. 4 is a diagram illustrating an example 400 associated with LTE-CRS interference handling, in accordance with the present disclosure. As shown in FIG. 4, example 400 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

In some aspects, the base station 110 may be an NR base station (e.g., a 5G base station, or a gNB), and the UE 120 may be an NR UE. In some aspects, an NR cell associated with the base station 110 may have one or more neighboring LTE cells. The neighboring LTE cells may be associated with one or more neighboring base stations (e.g., LTE base stations and/or base stations operating using DSS) to the base station 110. The UE 120 may be located in the NR cell associated with the base station 110 and one or more of the neighboring LTE cells.

As shown in FIG. 4, and by reference number 405, the base station 110 may transmit, to the UE 120, a configuration of a set of resources for LTE-CRS measurements associated with one or more neighboring LTE cells. The UE 120 may receive the configuration of the set of resources for the LTE-CRS measurements. For example, the base station 110 may transmit the configuration to the UE 120 in a radio resource control (RRC) message. The configuration may identify resources (e.g., the set of REs) for the UE 120 to perform LTE-CRS interference measurements. The set of REs may be configured in a pattern that matches a pattern of REs configured for transmitting one or more LTE-CRSs in one or more neighboring LTE cell.

A neighboring LTE cell may be configured with different LTE-CRSs that are transmitted from different antenna ports. LTE-CRSs transmitted in different neighboring LTE cells may have different v-shift values and/or different pseudo-random sequences applied to LTE-CRS REs. In some aspects, the set of REs may be associated with a pattern of REs configured for a single LTE-CRS in a single neighboring LTE cell. For example, the set of REs may be associated with one antenna port with one v-shift value (e.g., one antenna port of one neighboring LTE cell). In some aspects, the set of REs may be associated with a pattern of REs configured for multiple LTE-CRSs in a single neighboring LTE cell. For example, the set of REs may be associated with multiple antenna ports with one v-shift value (e.g., multiple antenna ports of one neighboring LTE cell). In some aspects, the set of REs may be associated with a pattern of REs configured for LTE-CRSs in multiple neighboring LTE cells. For example, the set of REs may be associated with one or more antenna elements with multiple v-shift values (e.g., one or more antenna elements in a plurality of neighboring LTE cells). In some aspects, the base station 110 may configure the UE 120 with one or more sets of REs for performing LTE-CRS interference measurements. For example, in a case in which the base station 110 transmits a configuration of multiple sets of REs, each set of REs is associated with a pattern of REs configured for a respective set of LTE-CRSs in one or more neighboring LTE cells (e.g., a respective set of REs covering one or more antenna elements with one or more v-shift values).

In some aspects, the base station 110 may configure the UE 120 to measure the LTE-CRS interference using channel state information (CSI) interference measurement (CSI-IM) based measurements on the set of REs. For example, the set of REs may be a set of zero-power REs for performing CSI-IM measurements in a pattern associated with LTE-CRS transmissions (e.g., associated with one or more antenna ports) in one or more neighboring LTE cells. In this way, the UE 120 may be configured to measure the interference of the LTE-CRSs transmitted in the set of REs indicated in the configuration. In some aspects, the base station 110 may transmit, and the UE 120 may receive, a configuration of one or multiple sets of zero-power REs for performing the LTE-CRS interference measurements.

In some aspects, the base station 110 may configure the UE 120 to measure the LTE-CRS interference using non-zero power CSI reference signal (NZP-CSI-RS) based measurements on the set of REs. For example, the set of REs may be a set of NZP-CSI-RS REs in a pattern associated with LTE-CRS transmissions in one or more neighboring LTE cells. In this case, the UE 120 may measure a quality of an LTE-CRS transmission in an RE (e.g., as a desired CSI reference signal (CSI-RS)), and the UE 120 may determine an interference measurement based on the measured quality. In a case in which a set of NZP-CSI-RS REs are configured for the LTE-CRS interference measurements, the UE 120 may also be configured with one or more parameters associated with sequence generation of the LTE-CRS. For example, the configuration may include parameters associated with sequence generation of the LTE-CRS, such as a cell identifier, a slot index, a symbol index, a bandwidth, and/or a starting physical resource block (PRB) index associated with the LTE-CRS. In some aspects, the base station 110 may transmit, and the UE 120 may receive, a configuration of one or multiple sets of NZP-CSI-RS REs for performing the LTE-CRS interference measurements.

As further shown in FIG. 4, and by reference number 410, the UE 120 may perform LTE-CRS interference measurements on the set of REs. In some aspects, when the set of REs configured for the LTE-CRS interference measurements are a set of zero-power REs, the UE 120 may perform a respective interference measurement (e.g., a CSI-IM based measurement) on each RE in the set REs, and the UE 120 may estimate an interference power (and/or other measurement(s) of the interference) of the set of REs based at least in part on the respective interference measurements on the REs. For example, the UE 120 may calculate a co-variance of interference-plus-noise on each RE (e.g., based at least in part on a respective signal-to-interference-plus-noise (SINR) measurement), and the UE 120 may estimate the interference power (and/or other measurements(s) of the interference) over the set of REs based at least in part on the co-variance of the interference-plus-noise calculated on each RE.

In some aspects, when the set of REs configured for the LTE-CRS interference measurements are a set of NZP-CSI-RS REs, the UE 120 may perform a measurement of a quality of the respective LTE-CRS transmission on each RE of the set of REs, and the UE 120 may estimate an interference power of the set of REs based at least in part on the respective quality measurements on the REs. For example, the UE 120 may calculate the interference power by performing coherent detection of the LTE-CRS on each RE based at least in part on the cell identifier and/or other parameters associated with sequence generation for the LTE-CRS (e.g., slot index, symbol index, bandwidth, and/or starting PRB index) indicated in the configuration.

In some aspects, the UE 120 may determine (e.g., measure and/or calculate) respective interference measurements for one or more LTE-CRS hypotheses associated with the set of REs. Each LTE-CRS hypothesis may be associated with a respective LTE-CRS antenna port of a neighboring LTE cell of the one or more neighboring LTE cells. For example, each LTE-CRS hypothesis may be a respective LTE-CRS associated with an antenna port and a v-shift value. The interference measurement determined by the UE 120 for an LTE-CRS hypothesis may be an average interference measurement (e.g., an average power, quality, and/or other interference measurement of the measured interference) over the REs associated with the LTE-CRS hypothesis in the set of REs. For example, the REs associated with an LTE-CRS hypothesis may be all of the REs in the set of REs or a subset of the REs in the set of REs. In some aspects, the respective average interference measurement (or measurements) determined by the UE 120 for each LTE-CRS hypothesis may be at least one of an RSSI value (e.g., an average RSSI value of the LTE-CRS REs), an RSRP value (e.g., an average RSRP value of the LTE-CRS REs), an RSRQ value (e.g., an RSRQ value of the LTE-CRS REs), or an SINR value (e.g., an average SINR value of the LTE-CRS REs). In some aspects, the UE 120 may determine at least the average RSSI value for each LTE-CRS hypothesis when the UE 120 is configured with CSI-IM based interference measurements (e.g., zero-power REs). In some aspects, the UE 120 may determine at least one of the average RSRP, RSRQ, or SINR value for each LTE-CRS when the UE 120 is configured with NZP-CSI-RS based interference measurements.

As further shown in FIG. 4, and by reference number 415, the UE 120 may transmit, to the base station 110, an interference measurement indication based at least in part on the LTE-CRS interference measurements on the set of REs. The base station 110 may receive the interference measurement indication transmitted by the UE 120.

In some aspects, the interference measurement indication may include a report that indicates interference measurements performed by the UE 120. For example, the UE 120 may transmit, to the base station 110, a report that indicates the respective interference measurements for the one or more LTE-CRS hypotheses associated with the set of REs. In this case, the UE 120 may transmit, to the base station 110, the respective average interference measurements (e.g., RSSI, RSRP, RSRQ, and/or SINR) determined over the set of REs for one or more of the LTE-CRS hypotheses. In some aspects, the UE 120 may transmit the interference measurements (e.g., the average interference measurements) for all of the one or more LTE-CRS hypotheses associated with the set of REs. In some aspects, the order of reporting the interference measurements of the LTE-CRS hypotheses and/or a selection of for which of the LTE-CRS hypotheses to report interference may be determined by the UE 120 based at least in part on the respective interference measurements (e.g., the interference power) of the LTE-CRS hypotheses. For example, the UE 120 may report the average interference measurements for N CRS hypotheses with the highest average interference power measurement over the set of REs (e.g., the N strongest interferers of the LTE-CRS hypotheses). In this case, N may be indicated in the configuration or pre-configured according to a wireless communication standard, among other examples.

In some aspects, the report of the interference measurements from the UE 120 to the base station 110 may be periodic, semi-persistent, or aperiodic. In some aspects, the UE 120 may transmit the report to the base station 110 in uplink control information (UCI) and/or CSI feedback (e.g., in a CSI report).

As further shown in FIG. 4, and by reference number 420, the base station 110 may transmit, to the UE 120, a rate-matching indication that identifies an LTE-CRS rate-matching pattern for one or more downlink communications. The LTE-CRS rate-matching pattern may be a rate-matching pattern for rate-matching around LTE-CRS REs when receiving downlink communications. In some aspects, the LTE-CRS rate-matching pattern may include an LTE-CRS rate-matching pattern for PDSCH communications and/or an LTE-CRS rate-matching/puncturing pattern for PDCCH communications.

The base station 110 may determine the LTE-CRS rate-matching pattern (e.g., for PDSCH and/or PDCCH) based at least in part on the interference measurement indication received from the UE 120. For example, the base station 110 may receive the report including the respective interference measurements for one or more LTE-CRS hypotheses. The base station 110 may then determine, for each LTE-CRS hypothesis, whether the UE 120 is to rate-match around REs associated with that LTE-CRS hypothesis (e.g., for PDSCH and/or PDCCH reception) based at least in part on the respective interference measurement (or measurements) reported for that LTE-CRS hypothesis. For example, the base station 110 may determine that the UE 120 is to perform rate-matching around all of the LTE-CRS REs in the set of REs, a subset of the LTE-CRS REs (e.g., associated with one or more LTE-CRS hypotheses) in the set of REs, or none of the LTE-CRS REs in the set of REs based at least in part on the interference measurements indicated in the report received from the UE 120. The base station 110 may then transmit, to the UE 120, the rate-matching indication that identifies the LTE-CRS rate-matching pattern determined for the UE 120 (e.g., a UE-specific LTE-CRS rate-matching pattern for the UE 120).

In some aspects, the base station 110 may transmit the rate-matching indication to the UE 120 in an RRC message, a medium access control (MAC) control element (MAC-CE), or downlink control information (DCI). For example, the base station 110 may indicate the LTE-CRS rate-matching pattern for the UE 120 via a semi-static configuration (e.g., in an RRC message) or via a dynamic indication (e.g., in a MAC-CE or DCI).

In some aspects, the base station 110 may transmit one or more downlink communications to the UE 120, and the UE 120 may perform rate-matching for the one or more downlink communications in accordance with the LTE-CRS rate-matching pattern identified by the rate-matching indication received from the base station 110. For example, the UE 120 may perform rate-matching for one or more PDSCH communications in accordance with an LTE-CRS rate-matching pattern for PDSCH identified by the rate-matching indication received from the base station 110. Additionally, or alternatively, the UE 120 may perform rate-matching (and/or puncturing) for one or more PDCCH communications in accordance with an LTE-CRS rate-matching/puncturing pattern for PDCCH identified by the rate-matching indication received from the base station 110.

As described herein, the base station 110 may transmit a configuration of a set of REs for LTE-CRS measurements associated with one or more neighboring LTE cells. The UE 120 may perform LTE-interference measurements on the set of REs, and the UE 120 may transmit, to the base station 110, an interference measurement indication based at least in part on the LTE-CRS measurements. For example, the interference measurement indication may include respective interference measurements for one or more LTE-CRSs. The base station 110 may transmit, to the UE 120, a rate-matching indication that identifies an LTE-CRS rate-matching pattern to be used by the UE 120 (e.g., for receiving PDSCH and/or PDCCH communications). As a result, the UE 120 may perform rate-matching using a UE-specific LTE-CRS rate matching pattern that is determined by the base station 110 based at least in part on the LTE-CRS interference measured by the UE 120. Thus, the UE 120 may perform rate-matching around LTE-CRS transmissions that cause interference with downlink communications to the UE 120 (e.g., resulting in reduced interference and increased reliability of downlink communications), without performing unnecessary rate-matching around LTE-CRS transmissions that do not cause significant interference with downlink communications to the UE 120 (e.g., resulting in reduced overhead and latency of downlink communications, as compared with a cell-common configuration that applies to all UEs in the NR cell).

As indicated above, FIG. 4 is provided as an example. Other examples may differ from what is described with respect to FIG. 4.

Figure 5:
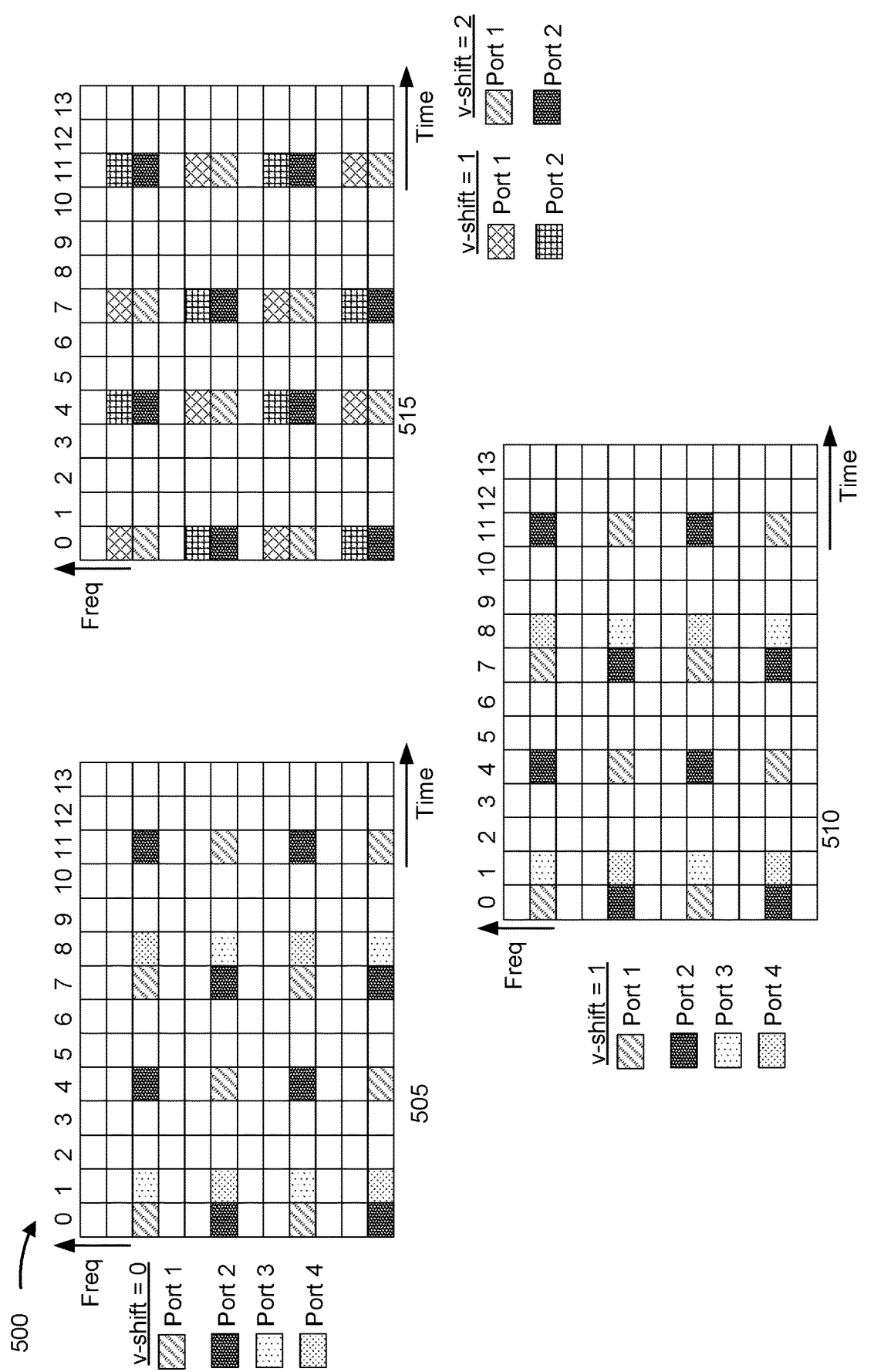

FIG. 5 is a diagram illustrating an example 500 associated with LTE-CRS interference handling, in accordance with the present disclosure. As shown in FIG. 5, example 500 shows examples of RE sets 505, 510, and 515 configured for LTE-CRS measurements. Each RE set 505, 510, and 515 includes REs (e.g., in a time domain and a frequency domain) configured for a UE 120 to perform respective LTE-CRS measurements. As described above in connection with FIG. 4, a set of REs configured for LTE-CRS measurements may include a pattern of REs that is associated with REs configured for transmissions of one or more LTE-CRSs (e.g., from one or more antenna ports) in one or more neighboring LTE cells (e.g., with one or more v-shift values).

As shown in FIG. 5, RE set 505 includes a set of REs associated with a pattern of REs configured for LTE-CRS transmissions associated with four antenna ports (e.g., port 1, port 2, port 3, and port 4) of a neighboring LTE cell (e.g., v-shift value=0). RE set 510 includes a set of REs associated with a pattern of REs configure for LTE-CRS transmissions associated with four antenna ports (e.g., port 1, port 2, port 3, and port 4) of another neighboring LTE cell (e.g., v-shift=1). RE set 515 includes a set of REs associated with a pattern of REs configured for two antenna ports in a first neighboring LTE cell (e.g., port 1 and port 2, v-shift=1) and a pattern of REs configured for two antenna ports in a second neighboring LTE cell (e.g., port 1 and port 2, v-shift=2).

As indicated above, FIG. 5 is provided as an example. Other examples may differ from what is described with respect to FIG. 5.

Figure 6:
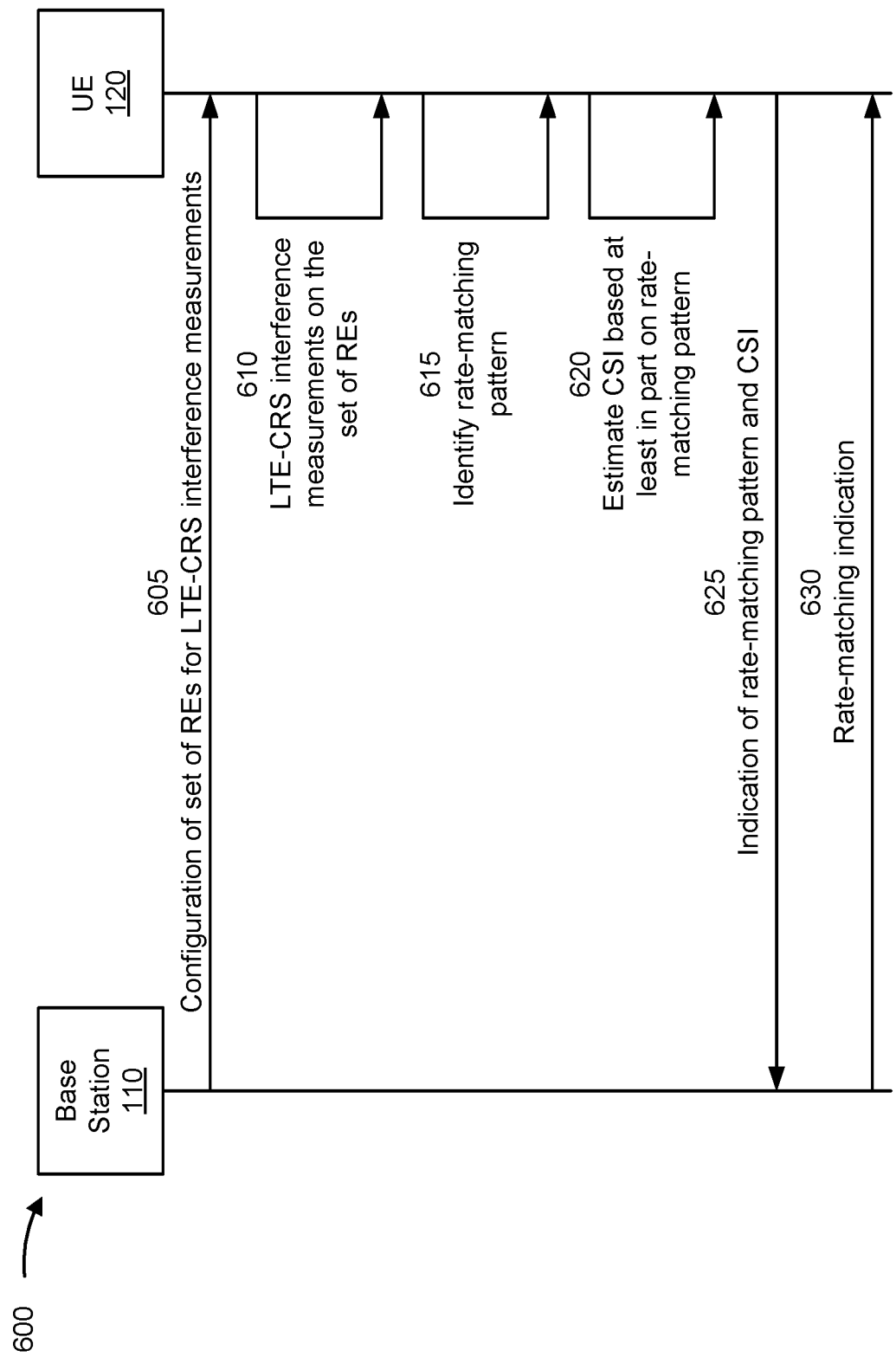

FIG. 6 is a diagram illustrating an example 600 associated with LTE-CRS interference handling, in accordance with the present disclosure. As shown in FIG. 6, example 600 includes communication between a base station 110 and a UE 120. In some aspects, the base station 110 and the UE 120 may be included in a wireless network, such as wireless network 100. The base station 110 and the UE 120 may communicate via a wireless access link, which may include an uplink and a downlink.

In some aspects, the base station 110 may be an NR base station (e.g., a 5G base station, or a gNB), and the UE 120 may be an NR UE. In some aspects, an NR cell associated with the base station 110 may have one or more neighboring LTE cells. The neighboring LTE cells may be associated with one or more neighboring base stations (e.g., LTE base stations and/or base stations operating using DSS) to the base station 110. The UE 120 may be located in the NR cell associated with the base station 110 and one or more of the neighboring LTE cells.

As shown in FIG. 6, and by reference number 605, the base station 110 may transmit, to the UE 120, a configuration of a set of resources for LTE-CRS measurements associated with one or more neighboring LTE cells. The UE 120 may receive the configuration of the set of resources for the LTE-CRS measurements. For example, the base station 110 may transmit the configuration to the UE 120 in an RRC message. The configuration may identify resources (e.g., the set of REs) for the UE 120 to perform LTE-CRS interference measurements. The set of REs may be configured in a pattern that matches a pattern of REs configured for transmitting one or more LTE-CRSs in one or more neighboring LTE cell.

In some aspects, the set of REs may be associated with a pattern of REs configured for a single LTE-CRS in a single neighboring LTE cell. For example, the set of REs may be associated with one antenna port with one v-shift value (e.g., one antenna port of one neighboring LTE cell). In some aspects, the set of REs may be associated with a pattern of REs configured for multiple LTE-CRSs in a single neighboring LTE cell. For example, the set of REs may be associated with multiple antenna ports with one v-shift value (e.g., multiple antenna ports of one neighboring LTE cell). In some aspects, the set of REs may be associated with a pattern of REs configured for LTE-CRSs in multiple neighboring LTE cells. For example, the set of REs may be associated with one or more antenna elements with multiple v-shift values (e.g., one or more antenna elements in a plurality of neighboring LTE cells). In some aspects, the base station 110 may configure the UE 120 with one or more sets of REs for performing LTE-CRS interference measurements. For example, in a case in which the base station 110 transmits a configuration of multiple sets of REs, each set of REs is associated with a pattern of REs configured for a respective set of LTE-CRSs in one or more neighboring LTE cells (e.g., a respective set of REs covering one or more antenna elements with one or more v-shift values).

In some aspects, the base station 110 may configure the UE 120 to measure the LTE-CRS interference using CSI-IM based measurements on the set of REs. For example, the set of REs may be a set of zero-power REs for performing CSI-IM measurements in a pattern associated with LTE-CRS transmissions (e.g., associated with one or more antenna ports) in one or more neighboring LTE cells. In this way, the UE 120 may be configured to measure the interference of the LTE-CRSs transmitted in the set of REs indicated in the configuration. In some aspects, the base station 110 may transmit, and the UE 120 may receive, a configuration of one or multiple sets of zero-power REs for performing the LTE-CRS interference measurements.

In some aspects, the base station 110 may configure the UE 120 to measure the LTE-CRS interference using NZP-CSI-RS based measurements on the set of REs. For example, the set of REs may be a set of NZP-CSI-RS REs in a pattern associated with LTE-CRS transmissions in one or more neighboring LTE cells. In this case, the UE 120 may measure a quality of an LTE-CRS transmission in an RE (e.g., as a desired CSI-RS), and the UE 120 may determine an interference measurement based on the measured quality. In a case in which a set of NZP-CSI-RS REs are configured for the LTE-CRS interference measurements, the UE 120 may also be configured with one or more parameters associated with sequence generation of the LTE-CRS. For example, the configuration may include parameters associated with sequence generation of the LTE-CRS, such as a cell identifier, a slot index, a symbol index, a bandwidth, and/or a starting PRB index associated with the LTE-CRS. In some aspects, the base station 110 may transmit, and the UE 120 may receive, a configuration of one or multiple sets of NZP-CSI-RS REs for performing the LTE-CRS interference measurements.

In some aspects, the base station 110 may configure the UE 120 with one or more parameters for the UE 120 to use to identify an LTE-CRS rate-matching pattern. The parameters, which may be included in a same message or a different message as the configuration of the set of REs, may include one or more higher-layer (e.g., layer 2 (L2) or layer 3 (L3)) parameters to be used by the UE 120 for identifying the LTE-CRS rate-matching pattern. For example, the base station 110 may transmit, to the UE 120, an indication of at least one of a signal-to-interference ratio (SIR) threshold or an SINR threshold to be used by the UE 120 to identify the LTE-CRS rate-matching pattern.

As further shown in FIG. 6, and by reference number 610, the UE 120 may perform LTE-CRS interference measurements on the set of REs. In some aspects, when the set of REs configured for the LTE-CRS interference measurements are a set of zero-power REs, the UE 120 may perform a respective interference measurement (e.g., a CSI-IM based measurement) on each RE in the set REs, and the UE 120 may estimate an interference power (and/or other measurement(s) of the interference) of the set of REs based at least in part on the respective interference measurements on the REs. For example, the UE 120 may calculate a co-variance of interference-plus-noise on each RE (e.g., based at least in part on a respective SINR measurement), and the UE 120 may estimate the interference power (and/or other measurements(s) of the interference) over the set of REs based at least in part on the co-variance of the interference-plus-noise calculated on each RE.

In some aspects, when the set of REs configured for the LTE-CRS interference measurements are a set of NZP-CSI-RS REs, the UE 120 may perform a measurement of a quality of the respective LTE-CRS transmission on each RE of the set of REs, and the UE 120 may estimate an interference power of the set of REs based at least in part on the respective quality measurements on the REs. For example, the UE 120 may calculate the interference power by performing coherent detection of the LTE-CRS on each RE based at least in part on the cell identifier and/or other parameters associated with sequence generation for the LTE-CRS (e.g., slot index, symbol index, bandwidth, and/or starting PRB index) indicated in the configuration.

In some aspects, the UE 120 may determine (e.g., measure and/or calculate) respective interference measurements for one or more LTE-CRS hypotheses associated with the set of REs. Each LTE-CRS hypothesis may be associated with a respective LTE-CRS antenna port of a neighboring LTE cell of the one or more neighboring LTE cells. For example, each LTE-CRS hypothesis may be a respective LTE-CRS associated with an antenna port and a v-shift value. The interference measurement determined by the UE 120 for an LTE-CRS hypothesis may be an average interference measurement (e.g., an average power, quality, and/or other interference measurement of the measured interference) over the REs associated with the LTE-CRS hypothesis in the set of REs. For example, the REs associated with an LTE-CRS hypothesis may be all of the REs in the set of REs or a subset of the REs in the set of REs. In some aspects, the respective average interference measurement (or measurements) determined by the UE 120 for each LTE-CRS hypothesis may be at least one of an RSSI value, an RSRP value, an RSRQ value, an SINR value, or an SIR value. In some aspects, the UE 120 may determine at least the average RSSI value for each LTE-CRS hypothesis when the UE 120 is configured with CSI-IM based interference measurements (e.g., zero-power REs). In some aspects, the UE 120 may determine at least the average RSRP value for each LTE-CRS when the UE 120 is configured with NZP-CSI-RS based interference measurements.

As further shown in FIG. 6, and by reference number 615, the UE 120 may identify a rate-matching pattern based at least in part on the LTE-CRS interference measurements performed on the set of REs. For example, the UE 120 may identify a recommended LTE-CRS rate-matching pattern to be used by the UE 120 for one or downlink communications. The UE 120 may identify the LTE-CRS rate-matching pattern by determining, for each of one or more LTE-CRSs of the one or more neighboring LTE cells associated with the set of REs (e.g., for each LTE-CRS hypothesis of the one or more LTE-CRS hypotheses), whether to include rate-matching around that LTE-CRS in the LTE-CRS rate-matching pattern (e.g., whether to rate-match around the REs associated with that LTE-CRS). The UE 120 may determine whether to rate-match around the REs associated with an LTE-CRS (e.g., an LTE-CRS hypothesis) based at least in part on the interference measurements determined for that LTE-CRS (e.g., over the set of REs associated with that LTE-CRS).

Using the interference measurements on the REs associated with an LTE-CRS, the UE 120 may determine whether to rate-match around the LTE-CRS based at least in part on a trade-off between interference mitigation and increased PDSCH/PDCCH overhead associated with rate-matching around the LTE-CRS REs. In some aspects, the UE 120 may determine whether to rate-match around REs associated with an LTE-CRS based at least in part on a comparison of an SINR value for the LTE-CRS (e.g., the average SINR value over the REs associated with the LTE-CRS) with an SINR threshold. For example, The UE 120 may receive an indication of the SINR threshold from the base station 110 (e.g., in an RRC configuration). If the SINR value for the LTE-CRS satisfies the threshold, the UE 120 may determine to rate-match around the REs associated with the LTE-CRS. If the SINR value does not satisfy the threshold, the UE 120 may determine not to rate-match around the REs associated with the LTE-CRS. Additionally, or alternatively, the UE 120 may determine whether to rate-match around REs associated with an LTE-CRS based at least in part on a comparison of an SIR value for the LTE-CRS (e.g., the average SINR value over the REs associated with the LTE-CRS) with an SIR threshold. For example, The UE 120 may receive an indication of the SIR threshold from the base station 110 (e.g., in an RRC configuration).

In some aspects, the UE 120 may identify an LTE-CRS rate-matching pattern in which rate-matching is performed for all or a subset of the LTE-CRS REs in the set of REs. In some aspects, the UE 120 may identify an LTE-CRS rate-matching pattern in which no rate-matching is performed for all or a subset of the LTE-CRS REs in the set of REs.

As further shown in FIG. 6, and by reference number 620, the UE 120 may estimate CSI based at least in part on the rate-matching pattern identified by the UE 120. The UE 120 may estimate CSI resulting from applying the LTE-CRS rate-matching pattern identified by the UE 120. For example, for each LTE-CRS for which the UE 120 determines that rate-matching is to be performed in the LTE-CRS rate-matching pattern, the UE 120 may compute CSI under an assumption that the interference measured for that LTE-CRS is removed. In this case, for each LTE-CRS for which rate-matching is to be performed in accordance with the LTE-CRS rate-matching pattern, the UE 120 may estimate the CSI for a PDSCH without the measured interference associated with the LTE-CRS. For example, the estimated CSI may provide an estimate of the channel quality expected for a PDSCH reception without the LTE-CRS interference. In some aspects, the UE 120 may estimate CSI, including a CQI, a pre-coding matrix indicator (PMI), and/or a rank indicator (RI) without the measured interference for any LTE-CRS REs for which rate-matching is performed in the LTE-CRS rate-matching pattern identified by the UE 120.

As further shown in FIG. 6, and by reference number 625, the UE 120 may transmit, to the base station 110, an indication of the LTE-CRS rate-matching pattern identified by the UE 120 (e.g., the recommended LTE-CRS rate-matching pattern) and/or the CSI estimate based at least in part on the LTE-CRS rate-matching pattern identified by the UE 120. For example, the UE 120 may report the LTE-CRS rate-matching pattern to the base station 110. The UE 120 may also report the CSI estimated without LTE-CRS interference for LTE-CRS REs for which rate-matching is performed in the LTE-CRS rate-matching pattern. In some aspects, the indication/report of the LTE-CRS rate-matching pattern (e.g., the recommended LTE-CRS rate-matching pattern) may be multiplexed with the CSI in a same UCI feedback transmission from the UE 120 to the base station 110. In some aspects, the indication/report of the LTE-CRS rate-matching pattern and the CSI may be transmitted in separate UCI transmissions from the UE 120 to the base station 110. In some aspects, an interference measurement indication transmitted from the UE 120 to the base station 110 may include the indication/report of the LTE-CRS rate-matching pattern identified by the UE 120 and/or the CSI estimated based at least in part on the LTE-CRS rate-matching pattern identified by the UE 120.

As further shown in FIG. 6, and by reference number 630, the base station 110 may transmit, to the UE 120, a rate-matching indication that identifies an LTE-CRS rate-matching pattern to be used by the UE 120 for one or more downlink communications. The base station 110 may receive the indication/report of the LTE-CRS rate-matching pattern identified by the UE 120 (e.g., the recommended LTE-CRS rate-matching), and the base station 110 may determine the LTE-CRS rate-matching pattern to be used by the UE 120 (e.g., for PDSCH and/or PDCCH) based at least in part on the recommended LTE-CRS rate-matching pattern received from the UE 120. For example, the base station 110 may determine whether the recommended LTE-CRS rate-matching pattern identified by the UE 120 is to be used by the UE 120 based at least in part on the CSI received from the UE 120 (e.g., the CSI estimated based at least in part on the recommended LTE-CRS rate-matching pattern). The base station 110 may then transmit, to the UE 120, the rate-matching indication that identifies the LTE-CRS rate-matching pattern for the UE 120 (e.g., the UE-specific LTE-CRS rate-matching pattern for the UE 120). The UE-specific LTE-CRS rate-matching pattern indicated by the rate-matching indication may be the recommended LTE-CRS rate-matching pattern identified by the UE 120 or a different LTE-CRS rate-matching pattern from the recommended LTE-CRS rate-matching pattern. In some aspects, the rate-matching indication may indicate whether the recommended LTE-CRS rate-matching pattern is selected for the UE 120.

The LTE-CRS rate-matching pattern indicated by the rate-matching indication may be a rate-matching pattern for rate-matching around LTE-CRS REs when receiving downlink communications. In some aspects, the LTE-CRS rate-matching pattern to be used by the UE 120 may include an LTE-CRS rate-matching pattern for PDSCH communications and/or an LTE-CRS rate-matching/puncturing pattern for PDCCH communications. In some aspects, the base station 110 may transmit the rate-matching indication (e.g., including an indication of the LTE-CRS rate-matching pattern for PDSCH and/or an indication of the LTE-CRS rate-matching/puncturing pattern for PDCCH) to the UE 120 in an RRC message, a MAC-CE, or DCI. For example, the base station 110 may indicate the LTE-CRS rate-matching pattern for the UE 120 (e.g., including the LTE-CRS rate-matching pattern for PDSCH and/or the LTE-CRS rate-matching/puncturing pattern for PDCCH) via a semi-static configuration (e.g., in an RRC message) or via a dynamic indication (e.g., in a MAC-CE or DCI).

In some aspects, the base station 110 may transmit one or more downlink communications to the UE 120, and the UE 120 may perform rate-matching for the one or more downlink communications in accordance with the LTE-CRS rate-matching pattern identified by the rate-matching indication received from the base station 110. For example, the UE 120 may perform rate-matching for one or more PDSCH communications in accordance with an LTE-CRS rate-matching pattern for PDSCH identified by the rate-matching indication received from the base station 110. Additionally, or alternatively, the UE 120 may perform rate-matching (and/or puncturing) for one or more PDCCH communications in accordance with an LTE-CRS rate-matching/puncturing pattern for PDCCH identified by the rate-matching indication received from the base station 110.

As described herein, the base station 110 may transmit a configuration of a set of REs for LTE-CRS measurements associated with one or more neighboring LTE cells. The UE 120 may perform LTE-interference measurements on the set of REs, and the UE 120 may identify a recommended LTE-CRS rate-matching pattern based at least in part on the LTE-CRS measurements. The UE 120 may estimate CSI based at least in part on the recommended LTE-CRS rate-matching pattern, and the UE 120 may transmit an indication of the recommended LTE-CRS rate-matching pattern and/or the CSI to the base station 110. The base station 110 may transmit, to the UE 120, a rate-matching indication that identifies an LTE-CRS rate-matching pattern to be used by the UE 120 (e.g., for receiving PDSCH and/or PDCCH communications). As a result, the UE 120 may perform rate-matching using a UE-specific LTE-CRS rate matching pattern that is determined by the base station 110 based at least in part on the LTE-CRS interference measured by the UE 120. Thus, the UE 120 may perform rate-matching around LTE-CRS transmissions that cause interference with downlink communications to the UE 120 (e.g., resulting in reduced interference and increased reliability of downlink communications), without performing unnecessary rate-matching around LTE-CRS transmissions that do not cause significant interference with downlink communications to the UE 120 (e.g., resulting in reduced overhead and latency of downlink communications, as compared with a cell-common configuration that applies to all UEs in the NR cell).

As indicated above, FIG. 6 is provided as an example. Other examples may differ from what is described with respect to FIG. 6.

Figure 7:
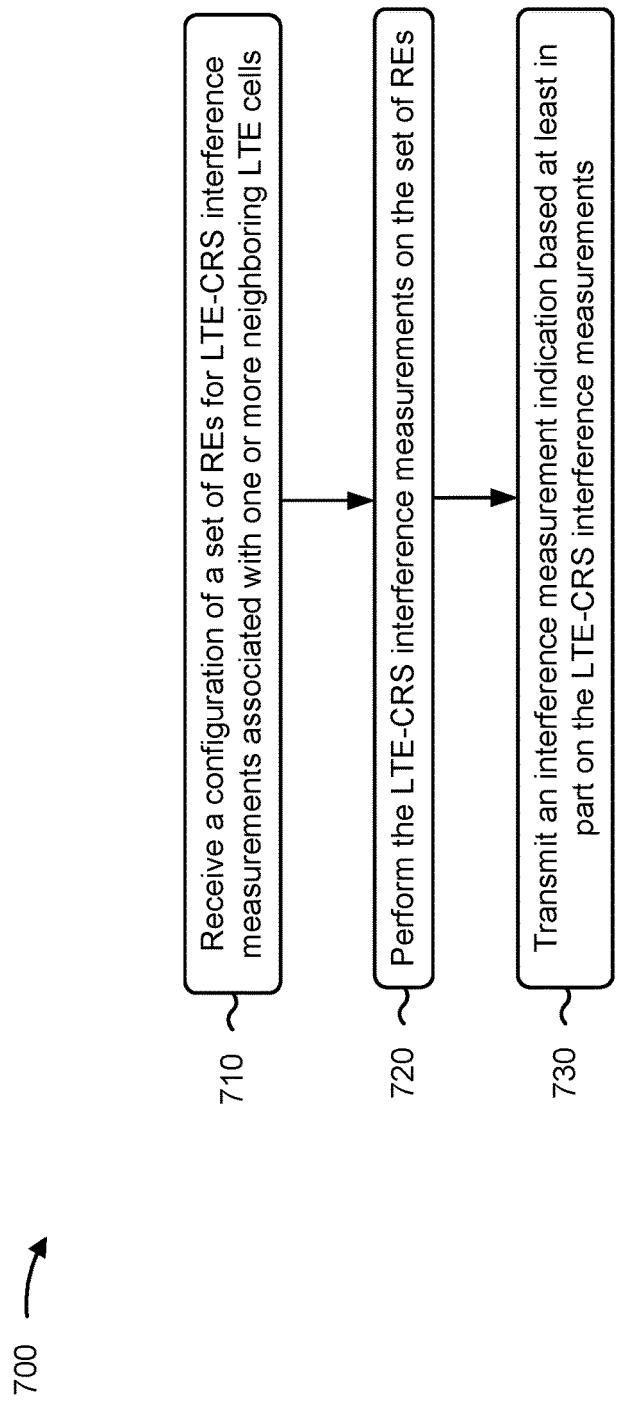
FIGS. 7-8 are diagrams illustrating example processes associated with LTE-CRS interference handling, in accordance with the present disclosure.

FIG. 7 is a diagram illustrating an example process 700 performed, for example, by a UE, in accordance with the present disclosure. Example process 700 is an example where the UE (e.g., UE 120) performs operations associated with LTE-CRS interference handling.

As shown in FIG. 7, in some aspects, process 700 may include receiving, from a base station, a configuration of a set of REs for LTE-CRS interference measurements associated with one or more neighboring LTE cells (block 710). For example, the UE (e.g., using communication manager 140 and/or reception component 902, depicted in FIG. 9) may receive, from a base station, a configuration of a set of REs for LTE-CRS interference measurements associated with one or more neighboring LTE cells, as described above.

As further shown in FIG. 7, in some aspects, process 700 may include performing the LTE-CRS interference measurements on the set of REs (block 720). For example, the UE (e.g., using communication manager 140 and/or measurement component 908, depicted in FIG. 9) may perform the LTE-CRS interference measurements on the set of REs, as described above.

As further shown in FIG. 7, in some aspects, process 700 may include transmitting, to the base station, an interference measurement indication based at least in part on the LTE-CRS interference measurements (block 730). For example, the UE (e.g., using communication manager 140 and/or transmission component 904, depicted in FIG. 9) may transmit, to the base station, an interference measurement indication based at least in part on the LTE-CRS interference measurements, as described above.

Process 700 may include additional aspects, such as any single aspect or any combination of aspects described below and/or in connection with one or more other processes described elsewhere herein.

In a first aspect, process 700 includes receiving, from the base station, a rate-matching indication that identifies LTE-CRS rate-matching pattern for one or more downlink communications.

In a second aspect, alone or in combination with the first aspect, the rate-matching indication that identifies the LTE-CRS rate-matching pattern for the one or more downlink communications is included in at least one of an RRC message, DCI, or a MAC-CE.

In a third aspect, alone or in combination with one or more of the first and second aspects, the set of REs is associated with one or more LTE-CRS antenna ports of a neighboring LTE cell.

In a fourth aspect, alone or in combination with one or more of the first through third aspects, the set of REs is associated with one or more LTE-CRS antenna ports of a plurality of neighboring LTE cells.

In a fifth aspect, alone or in combination with one or more of the first through fourth aspects, the set of REs is a set of zero power REs for channel state information interference measurements in a pattern associated with LTE-CRS transmissions in the one or more neighboring LTE cells.

In a sixth aspect, alone or in combination with one or more of the first through fifth aspects, performing the LTE-CRS interference measurements on the set of REs includes performing a respective interference measurement on each RE of the set of REs, and estimating an interference power of the set of REs based at least in part on the respective interference measurement on each RE of the set of REs.

In a seventh aspect, alone or in combination with one or more of the first through sixth aspects, the set of REs is a set of non-zero power channel state information reference signal REs in a pattern associated with LTE-CRS transmissions in the one or more neighboring LTE cells.

In an eighth aspect, alone or in combination with one or more of the first through seventh aspects, performing the LTE-CRS interference measurements on the set of REs includes performing measurement of a quality of a respective LTE-CRS transmission on each RE of the set of REs, and estimating an interference power of the set of REs based at least in part on the measurement of the quality of the respective LTE-CRS transmission on each RE of the set of REs.

In a ninth aspect, alone or in combination with one or more of the first through eighth aspects, transmitting the interference measurement indication based at least in part on the LTE-CRS interference measurements includes transmitting, to the base station, a report that indicates respective interference measurements for one or more LTE-CRS hypotheses, and each LTE-CRS hypothesis of the one or more LTE-CRS hypotheses is associated with a respective LTE-CRS antenna port of a neighboring LTE cell of the one or more neighboring LTE cells.

In a tenth aspect, alone or in combination with one or more of the first through ninth aspects, the respective interference measurement, for each LTE-CRS hypothesis of one or more LTE-CRS hypotheses, is an average interference measurement for the LTE-CRS hypothesis over the set of REs.

In an eleventh aspect, alone or in combination with one or more of the first through tenth aspects, the average interference measurement is at least one of an RSSI value, an RSRP value, an RSRQ value, or an SINR value.

In a twelfth aspect, alone or in combination with one or more of the first through eleventh aspects, transmitting the interference measurement indication based at least in part on the LTE-CRS interference measurements includes transmitting, to the base station, an indication of an LTE-CRS rate-matching pattern based at least in part on the LTE-CRS interference measurements.

In a thirteenth aspect, alone or in combination with one or more of the first through twelfth aspects, process 700 includes identifying the LTE-CRS rate-matching pattern based at least in part on the LTE-CRS interference measurements.

In a fourteenth aspect, alone or in combination with one or more of the first through thirteenth aspects, identifying the LTE-CRS rate-matching pattern includes determining, for each of one or more LTE-CRSs of the one or more neighboring LTE cells, whether to include rate-matching around the LTE-CRS in the LTE-CRS rate-matching pattern based at least in part on the LTE-CRS interference measurements and a signal-to-interference ratio threshold or a signal-to-interference-plus-noise ratio threshold.

In a fifteenth aspect, alone or in combination with one or more of the first through fourteenth aspects, process 700 includes receiving, from the base station, an indication of the signal-to-interference ratio threshold or the signal-to-interference-plus-noise ratio threshold.

In a sixteenth aspect, alone or in combination with one or more of the first through fifteenth aspects, process 700 includes transmitting, to the base station, estimated channel state information based at least in part on the LTE-CRS rate-matching pattern.

In a seventeenth aspect, alone or in combination with one or more of the first through sixteenth aspects, the estimated channel state information includes at least one of a CQI, a PMI, or an RI.

In an eighteenth aspect, alone or in combination with one or more of the first through seventeenth aspects, the indication of the recommended LTE-CRS rate-matching pattern is multiplexed with the estimated channel state information in a transmission of uplink control information.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
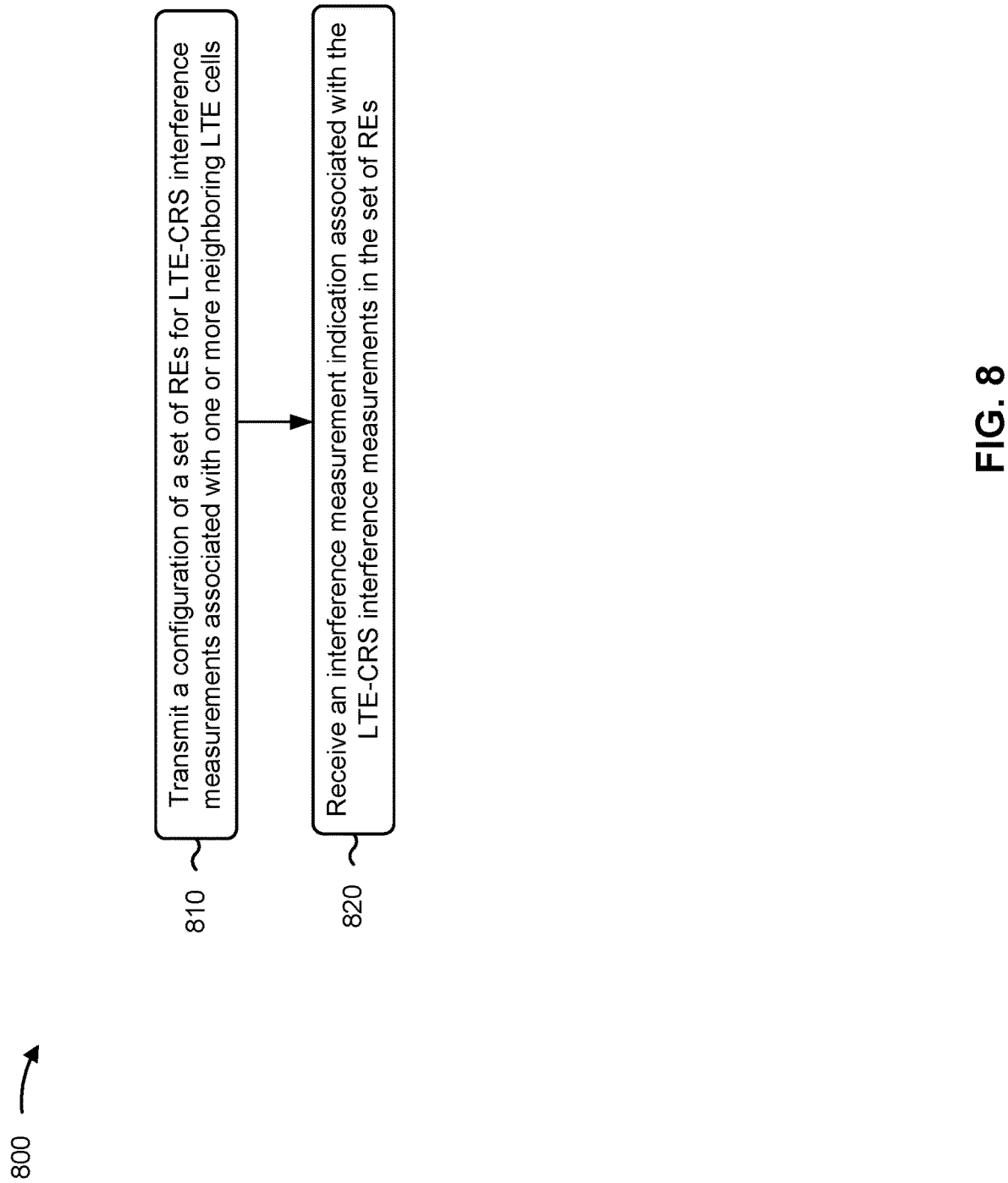

FIG. 8 is a diagram illustrating an example process 800 performed, for example, by a base station, in accordance with the present disclosure. Example process 800 is an example where the base station (e.g., base station 110) performs operations associated with LTE-CRS interference handling.

As shown in FIG. 8, in some aspects, process 800 may include transmitting, to a UE, a configuration of a set of REs for LTE-CRS interference measurements associated with one or more neighboring LTE cells (block 810). For example, the base station (e.g., using communication manager 150 and/or transmission component 1004, depicted in FIG. 10) may transmit, to a UE, a configuration of a set of REs for LTE-CRS interference measurements associated with one or more neighboring LTE cells, as described above.

As further shown in FIG. 8, in some aspects, process 800 may include receiving, from the UE, an interference measurement indication associated with the LTE-CRS interference measurements in the set of REs (block 820). For example, the base station (e.g., using communication manager 150 and/or reception component 1002, depicted in FIG. 10) may receive, from the UE, an interference measurement indication associated with the LTE-CRS interference measurements in the set of REs, as described above.

Process 800 may include additional aspects, such as any single aspect or any combination of aspects described below and/or in connection with one or more other processes described elsewhere herein.

In a first aspect, process 800 includes transmitting, to the UE, a rate-matching indication that identifies an LTE-CRS rate-matching pattern for one or more downlink communications based at least in part on the interference measurement indication associated with the LTE-CRS interference measurements in the set of REs.

In a second aspect, alone or in combination with the first aspect, the rate-matching indication that identifies the LTE-CRS rate-matching pattern for the one or more downlink communications is included in at least one of an RRC message, DCI, or a MAC-CE.

In a third aspect, alone or in combination with one or more of the first and second aspects, the set of REs is associated with one or more LTE-CRS antenna ports of a neighboring LTE cell.

In a fourth aspect, alone or in combination with one or more of the first through third aspects, the set of REs is associated with one or more LTE-CRS antenna ports of a plurality of neighboring LTE cells.

In a fifth aspect, alone or in combination with one or more of the first through fourth aspects, the set of REs is a set of zero power REs for channel state information interference measurements in a pattern associated with LTE-CRS transmissions in the one or more neighboring LTE cells.

In a sixth aspect, alone or in combination with one or more of the first through fifth aspects, the set of REs is a set of non-zero power channel state information reference signal REs in a pattern associated with LTE-CRS transmissions in the one or more neighboring LTE cells.

In a seventh aspect, alone or in combination with one or more of the first through sixth aspects, receiving the interference measurement indication associated with the LTE-CRS interference measurements in the set of REs includes receiving, from the UE, a report that indicates respective interference measurements for one or more LTE-CRS hypotheses, and each LTE-CRS hypothesis of the one or more LTE-CRS hypotheses is associated with a respective LTE-CRS antenna port of a neighboring LTE cell of the one or more neighboring LTE cells.

In an eighth aspect, alone or in combination with one or more of the first through seventh aspects, the respective interference measurement, for each LTE-CRS hypothesis of one or more LTE-CRS hypotheses, is an average interference measurement for the LTE-CRS hypothesis over the set of REs.

In a ninth aspect, alone or in combination with one or more of the first through eighth aspects, the average interference measurement is at least one of an RSSI value, an RSRP value, an RSRQ value, or an SINR value.

In a tenth aspect, alone or in combination with one or more of the first through ninth aspects, receiving the interference measurement indication associated with the LTE-CRS interference measurements in the set of REs includes receiving, from the UE, an indication of an LTE-CRS rate-matching pattern based at least in part on the LTE-CRS interference measurements.

In an eleventh aspect, alone or in combination with one or more of the first through tenth aspects, process 800 includes transmitting, to the UE, an indication of a threshold associated with identifying the LTE-CRS rate-matching pattern, and the threshold is a signal-to-interference ratio threshold or a signal-to-interference-plus-noise ratio threshold.

In a twelfth aspect, alone or in combination with one or more of the first through eleventh aspects, process 800 includes receiving, from the UE, estimated channel state information based at least in part on the LTE-CRS rate-matching pattern.

In a thirteenth aspect, alone or in combination with one or more of the first through twelfth aspects, the estimated channel state information includes at least one of a CQI, a PMI, or an RI.

In a fourteenth aspect, alone or in combination with one or more of the first through thirteenth aspects, the indication of the recommended LTE-CRS rate-matching pattern is multiplexed with the estimated channel state information in a transmission of uplink control information from the UE.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
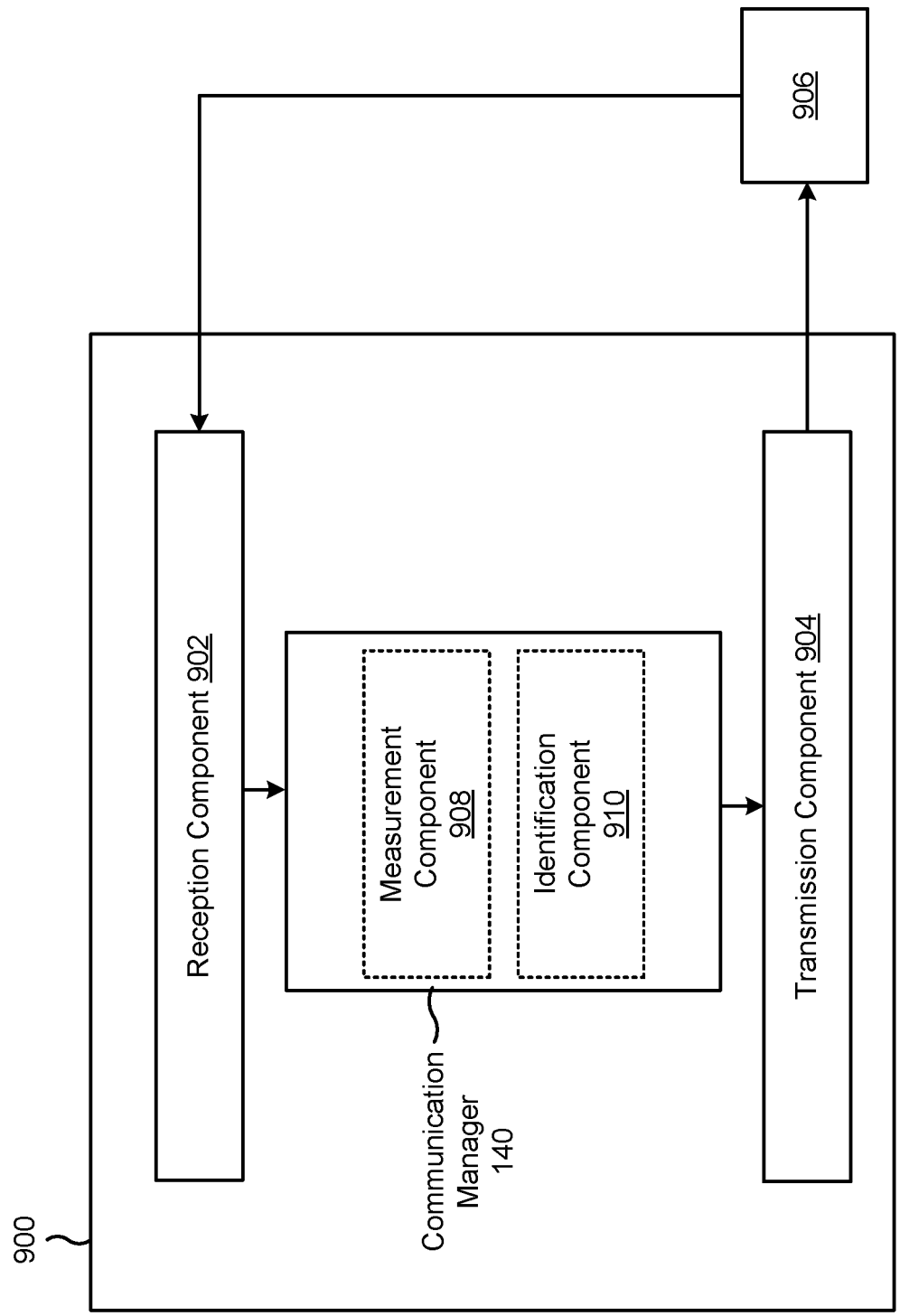
FIGS. 9-10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 140. The communication manager 140 may include one or more of a measurement component 908 and/or an identification component 910, among other examples.

In some aspects, the apparatus 900 may be configured to perform one or more operations described herein in connection with FIGS. 4-6. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive, from a base station, a configuration of a set of REs for LTE-CRS interference measurements associated with one or more neighboring LTE cells. The measurement component 908 may perform the LTE-CRS interference measurements on the set of REs. The transmission component 904 may transmit, to the base station, an interference measurement indication based at least in part on the LTE-CRS interference measurements.

The reception component 902 may receive, from the base station, a rate-matching indication that identifies LTE-CRS rate-matching pattern for one or more downlink communications.

The identification component 910 may identify the LTE-CRS rate-matching pattern based at least in part on the LTE-CRS interference measurements.

The reception component 902 may receive, from the base station, an indication of the signal-to-interference ratio threshold or the signal-to-interference-plus-noise ratio threshold.

The transmission component 904 may transmit, to the base station, estimated channel state information based at least in part on the LTE-CRS rate-matching pattern.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
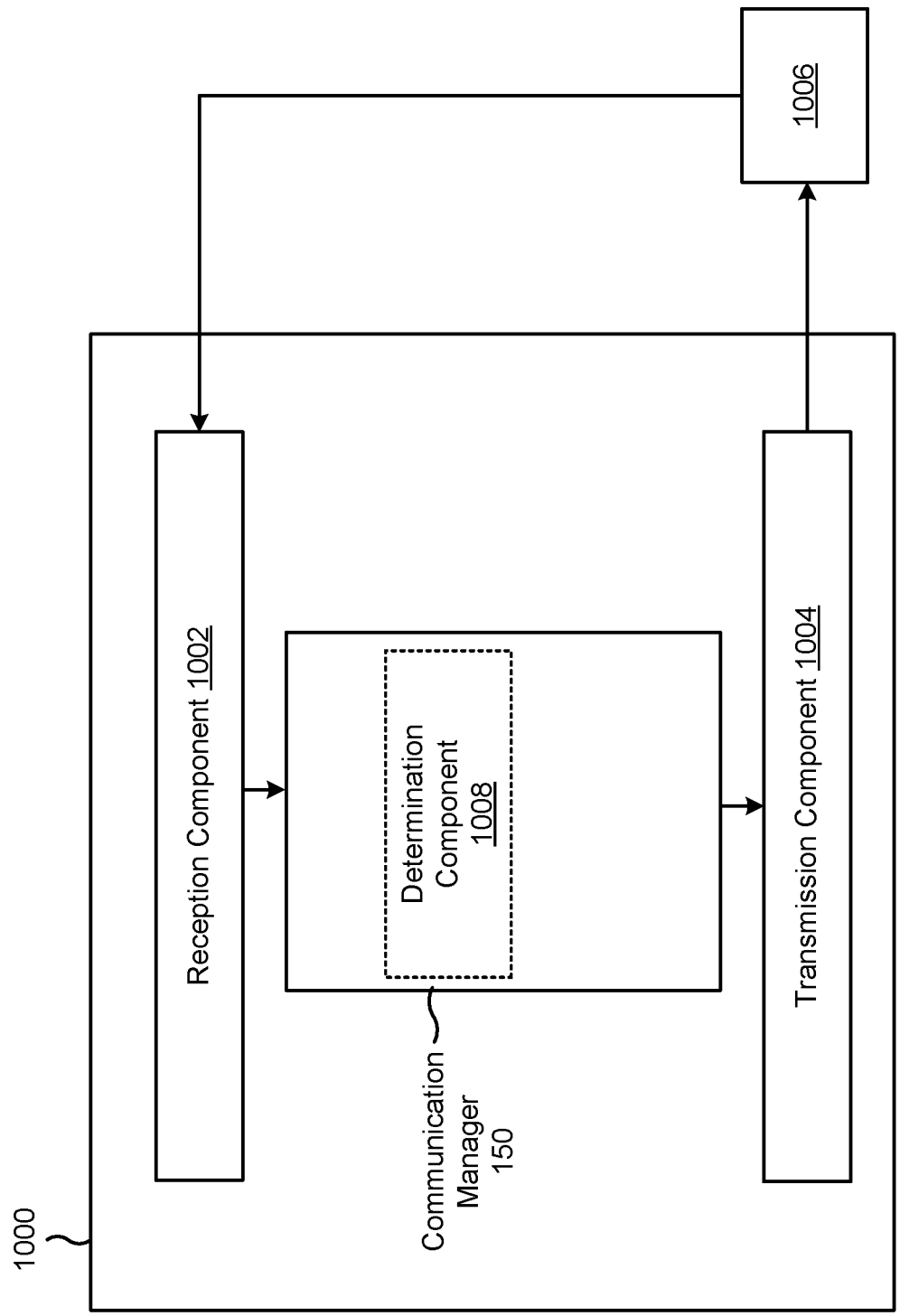

FIG. 10 is a diagram of an example apparatus 1000 for wireless communication. The apparatus 1000 may be a base station, or a base station may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include the communication manager 150. The communication manager 150 may include a determination component 1008, among other examples.

In some aspects, the apparatus 1000 may be configured to perform one or more operations described herein in connection with FIGS. 4-6. Additionally, or alternatively, the apparatus 1000 may be configured to perform one or more processes described herein, such as process 800 of FIG. 8, or a combination thereof. In some aspects, the apparatus 1000 and/or one or more components shown in FIG. 10 may include one or more components of the base station described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the base station described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the base station described in connection with FIG. 2. In some aspects, the transmission component 1004 may be co-located with the reception component 1002 in a transceiver.

The transmission component 1004 may transmit, to a UE, a configuration of a set of REs for LTE-CRS interference measurements associated with one or more neighboring LTE cells. The reception component 1002 may receive, from the UE, an interference measurement indication associated with the LTE-CRS interference measurements in the set of REs.

The transmission component 1004 may transmit, to the UE, a rate-matching indication that identifies an LTE-CRS rate-matching pattern for one or more downlink communications based at least in part on the interference measurement indication associated with the LTE-CRS interference measurements in the set of REs.

The determination component 1008 may determine the LTE-CRS rate matching pattern for the one or more downlink communications based at least in part on the interference measurement indication.

The transmission component 1004 may transmit, to the UE, an indication of a threshold associated with identifying the LTE-CRS rate-matching pattern, wherein the threshold is a signal-to-interference ratio threshold or a signal-to-interference-plus-noise ratio threshold.

The reception component 1002 may receive, from the UE, estimated channel state information based at least in part on the LTE-CRS rate-matching pattern.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a user equipment (UE), comprising: receiving, from a base station, a configuration of a set of resource elements for long term evolution (LTE) cell-specific reference signal (LTE-CRS) interference measurements associated with one or more neighboring LTE cells; performing the LTE-CRS interference measurements on the set of resource elements; and transmitting, to the base station, an interference measurement indication based at least in part on the LTE-CRS interference measurements.

Aspect 2: The method of Aspect 1, further comprising: receiving, from the base station, a rate-matching indication that identifies LTE-CRS rate-matching pattern for one or more downlink communications.

Aspect 3: The method of Aspect 2, wherein the rate-matching indication that identifies the LTE-CRS rate-matching pattern for the one or more downlink communications is included in at least one of a radio resource control (RRC) message, downlink control information (DCI), or a medium access control (MAC) control element (MAC-CE).

Aspect 4: The method of any of Aspects 1-3, wherein the set of resource elements is associated with one or more LTE-CRS antenna ports of a neighboring LTE cell.

Aspect 5: The method of any of Aspects 1-3, wherein the set of resource elements is associated with one or more LTE-CRS antenna ports of a plurality of neighboring LTE cells.

Aspect 6: The method of any of Aspects 1-5, wherein the set of resource elements is a set of zero power resource elements for channel state information interference measurements in a pattern associated with LTE-CRS transmissions in the one or more neighboring LTE cells.

Aspect 7: The method of Aspect 6, wherein performing the LTE-CRS interference measurements on the set of resource elements comprises: performing a respective interference measurement on each resource element of the set of resource elements; and estimating an interference power of the set of resource elements based at least in part on the respective interference measurement on each resource element of the set of resource elements.

Aspect 8: The method of any of Aspects 1-5, wherein the set of resource elements is a set of non-zero power channel state information reference signal resource elements in a pattern associated with LTE-CRS transmissions in the one or more neighboring LTE cells.

Aspect 9: The method of Aspect 8, wherein performing the LTE-CRS interference measurements on the set of resource elements comprises: performing measurement of a quality of a respective LTE-CRS transmission on each resource element of the set of resource elements; and estimating an interference power of the set of resource elements based at least in part on the measurement of the quality of the respective LTE-CRS transmission on each resource element of the set of resource elements.

Aspect 10: The method of any of Aspects 1-9, wherein transmitting the interference measurement indication based at least in part on the LTE-CRS interference measurements comprises: transmitting, to the base station, a report that indicates respective interference measurements for one or more LTE-CRS hypotheses, wherein each LTE-CRS hypothesis of the one or more LTE-CRS hypotheses is associated with a respective LTE-CRS antenna port of a neighboring LTE cell of the one or more neighboring LTE cells.

Aspect 11: The method of Aspect 10, wherein the respective interference measurement, for each LTE-CRS hypothesis of one or more LTE-CRS hypotheses, is an average interference measurement for the LTE-CRS hypothesis over the set of resource elements.

Aspect 12: The method of Aspect 11, wherein the average interference measurement is at least one of a received signal strength indicator (RSSI) value, a reference signal received power (RSRP) value, a reference signal received quality (RSRQ) value, or a signal-to-interference-plus-noise (SINR) value.

Aspect 13: The method of any of Aspects 1-9, wherein transmitting the interference measurement indication based at least in part on the LTE-CRS interference measurements comprises: transmitting, to the base station, an indication of an LTE-CRS rate-matching pattern based at least in part on the LTE-CRS interference measurements.

Aspect 14: The method of Aspect 13, further comprising: identifying the LTE-CRS rate-matching pattern based at least in part on the LTE-CRS interference measurements.

Aspect 15: The method of Aspect 14, wherein identifying the LTE-CRS rate-matching pattern comprises: determining, for each of one or more LTE-CRSs of the one or more neighboring LTE cells, whether to include rate-matching around the LTE-CRS in the LTE-CRS rate-matching pattern based at least in part on the LTE-CRS interference measurements and a signal-to-interference ratio threshold or a signal-to-interference-plus-noise ratio threshold.

Aspect 16: The method of Aspect 15, further comprising: receiving, from the base station, an indication of the signal-to-interference ratio threshold or the signal-to-interference-plus-noise ratio threshold.

Aspect 17: The method of any of Aspects 13-16, further comprising: transmitting, to the base station, estimated channel state information based at least in part on the LTE-CRS rate-matching pattern.

Aspect 18: The method of Aspect 17, wherein the estimated channel state information includes at least one of a channel quality indicator (CQI), a pre-coding matrix indicator (PMI), or a rank indicator (RI).

Aspect 19: The method of any of Aspects 17-18, wherein the indication of the LTE-CRS rate-matching pattern is multiplexed with the estimated channel state information in a transmission of uplink control information.

Aspect 20: A method of wireless communication performed by a base station, comprising: transmitting, to a user equipment (UE), a configuration of a set of resource elements for long term evolution (LTE) cell-specific reference signal (LTE-CRS) interference measurements associated with one or more neighboring LTE cells; and receiving, from the UE, an interference measurement indication associated with the LTE-CRS interference measurements in the set of resource elements.

Aspect 21: The method of Aspect 20, further comprising: transmitting, to the UE, a rate-matching indication that identifies an LTE-CRS rate-matching pattern for one or more downlink communications based at least in part on the interference measurement indication associated with the LTE-CRS interference measurements in the set of resource elements.

Aspect 22: The method of Aspect 21, wherein the rate-matching indication that identifies the LTE-CRS rate-matching pattern for the one or more downlink communications is included in at least one of a radio resource control (RRC) message, downlink control information (DCI), or a medium access control (MAC) control element (MAC-CE).

Aspect 23: The method of any of Aspects 20-22, wherein the set of resource elements is associated with one or more LTE-CRS antenna ports of a neighboring LTE cell.

Aspect 24: The method of any of Aspects 20-22, wherein the set of resource elements is associated with one or more LTE-CRS antenna ports of a plurality of neighboring LTE cells.

Aspect 25: The method of any of Aspects 20-24, wherein the set of resource elements is a set of zero power resource elements for channel state information interference measurements in a pattern associated with LTE-CRS transmissions in the one or more neighboring LTE cells.

Aspect 26: The method of any of Aspects 20-24, wherein the set of resource elements is a set of non-zero power channel state information reference signal resource elements in a pattern associated with LTE-CRS transmissions in the one or more neighboring LTE cells.

Aspect 27: The method of any of Aspects 20-26, wherein receiving the interference measurement indication associated with the LTE-CRS interference measurements in the set of resource elements comprises: receiving, from the UE, a report that indicates respective interference measurements for one or more LTE-CRS hypotheses, wherein each LTE-CRS hypothesis of the one or more LTE-CRS hypotheses is associated with a respective LTE-CRS antenna port of a neighboring LTE cell of the one or more neighboring LTE cells.

Aspect 28: The method of Aspect 27, wherein the respective interference measurement, for each LTE-CRS hypothesis of one or more LTE-CRS hypotheses, is an average interference measurement for the LTE-CRS hypothesis over the set of resource elements.

Aspect 29: The method of Aspect 28, wherein the average interference measurement is at least one of a received signal strength indicator (RSSI) value, a reference signal received power (RSRP) value, a reference signal received quality (RSRQ) value, or a signal-to-interference-plus-noise (SINR) value.

Aspect 30: The method of any of Aspects 20-26, wherein receiving the interference measurement indication associated with the LTE-CRS interference measurements in the set of resource elements comprises: receiving, from the UE, an indication of an LTE-CRS rate-matching pattern based at least in part on the LTE-CRS interference measurements.

Aspect 31: The method of Aspect 30, further comprising: transmitting, to the UE, an indication of a threshold associated with identifying the LTE-CRS rate-matching pattern, wherein the threshold is a signal-to-interference ratio threshold or a signal-to-interference-plus-noise ratio threshold.

Aspect 32: The method of any of Aspects 30-31, further comprising: receiving, from the UE, estimated channel state information based at least in part on the LTE-CRS rate-matching pattern.

Aspect 33: The method of Aspect 32, wherein the estimated channel state information includes at least one of a channel quality indicator (CQI), a pre-coding matrix indicator (PMI), or a rank indicator (RI).

Aspect 34: The method of any of Aspects 32-33, wherein the indication of the LTE-CRS rate-matching pattern is multiplexed with the estimated channel state information in a transmission of uplink control information from the UE.

Aspect 35: An apparatus for wireless communication at a device, comprising a processor; memory coupled with the processor; and instructions stored in the memory and executable by the processor to cause the apparatus to perform the method of one or more of Aspects 1-19.

Aspect 36: A device for wireless communication, comprising a memory and one or more processors coupled to the memory, the one or more processors configured to perform the method of one or more of Aspects 1-19.

Aspect 37: An apparatus for wireless communication, comprising at least one means for performing the method of one or more of Aspects 1-19.

Aspect 38: A non-transitory computer-readable medium storing code for wireless communication, the code comprising instructions executable by a processor to perform the method of one or more of Aspects 1-19.

Aspect 39: A non-transitory computer-readable medium storing a set of instructions for wireless communication, the set of instructions comprising one or more instructions that, when executed by one or more processors of a device, cause the device to perform the method of one or more of Aspects 1-19.

Aspect 40: An apparatus for wireless communication at a device, comprising a processor; memory coupled with the processor; and instructions stored in the memory and executable by the processor to cause the apparatus to perform the method of one or more of Aspects 20-34.

Aspect 41: A device for wireless communication, comprising a memory and one or more processors coupled to the memory, the one or more processors configured to perform the method of one or more of Aspects 20-34.

Aspect 42: An apparatus for wireless communication, comprising at least one means for performing the method of one or more of Aspects 20-34.

Aspect 43: A non-transitory computer-readable medium storing code for wireless communication, the code comprising instructions executable by a processor to perform the method of one or more of Aspects 20-34.

Aspect 44: A non-transitory computer-readable medium storing a set of instructions for wireless communication, the set of instructions comprising one or more instructions that, when executed by one or more processors of a device, cause the device to perform the method of one or more of Aspects 20-34.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
    a memory; and
    one or more processors, coupled to the memory, configured to:
        receive, from a base station, a configuration of a set of resource elements for long term evolution (LTE) cell-specific reference signal (LTE-CRS) interference measurements associated with one or more neighboring LTE cells;
        perform the LTE-CRS interference measurements on the set of resource elements; and
        transmit, to the base station, an interference measurement indication based at least in part on the LTE-CRS interference measurements, the interference measurement indication comprising:
            a report that indicates respective interference measurements for one or more LTE-CRS hypotheses, wherein each LTE-CRS hypothesis of the one or more LTE-CRS hypotheses is associated with a respective LTE-CRS antenna port of a neighboring LTE cell of the one or more neighboring LTE cells.

2. The UE of claim 1, wherein the one or more processors are further configured to:
    receive, from the base station, a rate-matching indication that identifies an LTE-CRS rate-matching pattern for one or more downlink communications.

3. The UE of claim 2, wherein the rate-matching indication that identifies the LTE-CRS rate-matching pattern for the one or more downlink communications is included in at least one of a radio resource control (RRC) message, downlink control information (DCI), or a medium access control (MAC) control element (MAC-CE).

4. The UE of claim 1, wherein the set of resource elements is associated with one or more LTE-CRS antenna ports of a neighboring LTE cell.

5. The UE of claim 1, wherein the set of resource elements is associated with one or more LTE-CRS antenna ports of a plurality of neighboring LTE cells.

6. The UE of claim 1, wherein the set of resource elements is a set of zero power resource elements for channel state information interference measurements in a pattern associated with LTE-CRS transmissions in the one or more neighboring LTE cells.

7. The UE of claim 6, wherein the one or more processors, to perform the LTE-CRS interference measurements on the set of resource elements, are configured to:
    perform a respective interference measurement on each resource element of the set of resource elements; and estimate an interference power of the set of resource elements based at least in part on the respective interference measurement on each resource element of the set of resource elements.

8. The UE of claim 1, wherein the set of resource elements is a set of non-zero power channel state information reference signal resource elements in a pattern associated with LTE-CRS transmissions in the one or more neighboring LTE cells.

9. The UE of claim 8, wherein the one or more processors, to perform the LTE-CRS interference measurements on the set of resource elements, are configured to:
perform measurement of a quality of a respective LTE-CRS transmission on each resource element of the set of resource elements; and
estimate an interference power of the set of resource elements based at least in part on the measurement of the quality of the respective LTE-CRS transmission on each resource element of the set of resource elements.

10. The UE of claim 1, wherein the respective interference measurement, for each LTE-CRS hypothesis of the one or more LTE-CRS hypotheses, is an average interference measurement for the LTE-CRS hypothesis over the set of resource elements.

11. The UE of claim 10, wherein the average interference measurement is at least one of a received signal strength indicator (RSSI) value, a reference signal received power (RSRP) value, a reference signal received quality (RSRQ) value, or a signal-to-interference-plus-noise (SINR) value.

12. The UE of claim 1, wherein the interference measurement indication further comprises an indication of an LTE-CRS rate-matching pattern and wherein the one or more processors are further configured to:
identify the LTE-CRS rate-matching pattern based at least in part on the LTE-CRS interference measurements.

13. The UE of claim 12, wherein the one or more processors, to identify the LTE-CRS rate-matching pattern, are configured to:
determine, for each of one or more LTE-CRSs of the one or more neighboring LTE cells, whether to include rate-matching around the LTE-CRS in the LTE-CRS rate-matching pattern based at least in part on the LTE-CRS interference measurements and a signal-to-interference ratio threshold or a signal-to-interference-plus-noise ratio threshold.

14. The UE of claim 13, wherein the one or more processors are further configured to:
receive, from the base station, an indication of the signal-to-interference ratio threshold or the signal-to-interference-plus-noise ratio threshold.

15. The UE of claim 1, wherein the interference measurement indication further comprises an indication of an LTE-CRS rate-matching pattern and wherein the one or more processors are further configured to:
transmit, to the base station, estimated channel state information based at least in part on the LTE-CRS rate-matching pattern.

16. The UE of claim 15, wherein the estimated channel state information includes at least one of a channel quality indicator (CQI), a pre-coding matrix indicator (PMI), or a rank indicator (RI).

17. The UE of claim 15, wherein the indication of the LTE-CRS rate-matching pattern is multiplexed with the estimated channel state information in a transmission of uplink control information.

18. A base station for wireless communication, comprising:

a memory; and
one or more processors, coupled to the memory, configured to:
transmit, to a user equipment (UE), a configuration of a set of resource elements for long term evolution (LTE) cell-specific reference signal (LTE-CRS) interference measurements associated with one or more neighboring LTE cells; and
receive, from the UE, an interference measurement indication associated with the LTE-CRS interference measurements in the set of resource elements, the interference measurement indication comprising:
a report that indicates respective interference measurements for one or more LTE-CRS hypotheses, wherein each LTE-CRS hypothesis of the one or more LTE-CRS hypotheses is associated with a respective LTE-CRS antenna port of a neighboring LTE cell of the one or more neighboring LTE cells.

19. The base station of claim 18, wherein the one or more processors are further configured to:
transmit, to the UE, a rate-matching indication that identifies an LTE-CRS rate-matching pattern for one or more downlink communications based at least in part on the interference measurement indication associated with the LTE-CRS interference measurements in the set of resource elements.

20. The base station of claim 18, wherein the interference measurement indication further comprises an indication of an LTE-CRS rate-matching pattern and wherein the one or more processors are further configured to:
receive, from the UE, estimated channel state information based at least in part on the LTE-CRS rate-matching pattern.

21. A method of wireless communication performed by a user equipment (UE), comprising:
receiving, from a base station, a configuration of a set of resource elements for long term evolution (LTE) cell-specific reference signal (LTE-CRS) interference measurements associated with one or more neighboring LTE cells;
performing the LTE-CRS interference measurements on the set of resource elements; and
transmitting, to the base station, an interference measurement indication based at least in part on the LTE-CRS interference measurements, the interference measurement indication comprising:
a report that indicates respective interference measurements for one or more LTE-CRS hypotheses, wherein each LTE-CRS hypothesis of the one or more LTE-CRS hypotheses is associated with a respective LTE-CRS antenna port of a neighboring LTE cell of the one or more neighboring LTE cells.

22. The method of claim 21, further comprising:
receiving, from the base station, a rate-matching indication that identifies an LTE-CRS rate-matching pattern for one or more downlink communications.

23. The method of claim 21, wherein the interference measurement indication further comprises an indication of an LTE-CRS rate-matching pattern and further comprising:
transmitting, to the base station, estimated channel state information based at least in part on the LTE-CRS rate-matching pattern.

24. A method of wireless communication performed by a base station, comprising:
transmitting, to a user equipment (UE), a configuration of a set of resource elements for long term evolution (LTE) cell-specific reference signal (LTE-CRS) interference measurements associated with one or more neighboring LTE cells; and receiving, from the UE, an interference measurement indication associated with the LTE-CRS interference measurements in the set of resource elements, the interference measurement indication comprising:
  a report that indicates respective interference measurements for one or more LTE-CRS hypotheses, wherein each LTE-CRS hypothesis of the one or more LTE-CRS hypotheses is associated with a respective LTE-CRS antenna port of a neighboring LTE cell of the one or more neighboring LTE cells.

* * * * *